United States Patent
Tasaki

(10) Patent No.: US 7,420,993 B2
(45) Date of Patent: Sep. 2, 2008

(54) VARIABLE LENGTH CODE MULTIPLEXER AND VARIABLE LENGTH CODE DEMULTIPLEXER

(75) Inventor: Hirohisa Tasaki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1129 days.

(21) Appl. No.: 10/222,917

(22) Filed: Aug. 19, 2002

(65) Prior Publication Data
US 2003/0043859 A1    Mar. 6, 2003

(30) Foreign Application Priority Data
Sep. 4, 2001    (JP)    ............... 2001-267598

(51) Int. Cl.
  *H04J 3/04* (2006.01)
  *H03M 7/40* (2006.01)
  *H03M 7/00* (2006.01)
(52) U.S. Cl. ............... 370/535; 341/67; 341/106
(58) Field of Classification Search ............... None
  See application file for complete search history.

(56) References Cited

U.S. PATENT DOCUMENTS

| | | | | |
|---|---|---|---|---|
| 5,218,622 A * | 6/1993 | Fazel et al. | ............... | 375/240 |
| 5,477,543 A * | 12/1995 | Purcell | ............... | 370/537 |
| 5,724,391 A * | 3/1998 | Takeuchi et al. | ............... | 375/240 |
| 5,734,430 A * | 3/1998 | Mishima et al. | ............... | 375/240.11 |
| 5,949,356 A * | 9/1999 | Kim et al. | ............... | 341/67 |
| 5,956,686 A * | 9/1999 | Takashima et al. | ............... | 704/500 |
| 5,990,963 A * | 11/1999 | Mishima et al. | ............... | 375/240.24 |
| 6,104,754 A * | 8/2000 | Chujoh et al. | ............... | 375/240.23 |
| 6,133,860 A * | 10/2000 | Ryu et al. | ............... | 341/67 |
| 6,182,031 B1 * | 1/2001 | Kidder et al. | ............... | 704/205 |
| 6,195,026 B1 * | 2/2001 | Acharya | ............... | 341/60 |
| 6,275,507 B1 * | 8/2001 | Anderson et al. | ............... | 370/487 |

(Continued)

FOREIGN PATENT DOCUMENTS

JP    9-146785 A    6/1997

(Continued)

OTHER PUBLICATIONS

ITU-T Recommendation G.722.1, Proceedings of International Telecommunication Union, (1999).

*Primary Examiner*—Kwang B. Yao
*Assistant Examiner*—Warner Wong
(74) *Attorney, Agent, or Firm*—Birch, Stewart, Kolasch & Birch, LLP

(57) ABSTRACT

A variable length code multiplexer multiplexes a plurality of input codes (102) including a variable length code into a multiplexed code (121) and outputs the multiplexed code (121). The multiplexer includes a forward direction multiplexing unit (22) for multiplexing the plurality of input codes (102) one by one so that they are running in a forward direction from a head of the multiplexed code (121) to a tail of the multiplexed code (121), a backward direction multiplexing unit (23) for multiplexing the plurality of input codes (102) one by one so that they are running in a backward direction from the tail of the multiplexed code (121) to the head of the multiplexed code (121), and a selection unit (25) for selecting either the forward direction multiplexing unit (22) or the backward direction multiplexing unit (23) for each of the plurality of input codes (102).

20 Claims, 11 Drawing Sheets

U.S. PATENT DOCUMENTS

| | | | |
|---|---|---|---|
| 6,311,306 B1* | 10/2001 | White et al. | 714/790 |
| 6,463,410 B1* | 10/2002 | Fuchigami et al. | 704/219 |
| 6,653,953 B2* | 11/2003 | Becker et al. | 341/60 |
| 6,744,928 B1* | 6/2004 | Juri et al. | 382/246 |
| 6,781,529 B1* | 8/2004 | Lin et al. | 341/106 |
| 6,871,175 B2* | 3/2005 | Amano | 704/216 |
| 6,970,479 B2* | 11/2005 | Abrahamsson et al. | 370/477 |
| 7,009,935 B2* | 3/2006 | Abrahamsson et al. | 370/228 |
| 7,308,099 B1* | 12/2007 | Allamanche et al. | 380/210 |
| 2004/0049382 A1* | 3/2004 | Yamaura et al. | 704/226 |

FOREIGN PATENT DOCUMENTS

| | | |
|---|---|---|
| JP | 2001-7775 A | 1/2001 |
| WO | 9219074 | 10/1992 |

* cited by examiner

VARIABLE LENGTH CODE MULTIPLEXER AND VARIABLE LENGTH CODE DEMULTIPLEXER

BACKGROUND OF THE INVENTION

1. Field of the Invention

The present invention relates to a variable length code multiplexer that multiplexes a plurality of input codes including a variable length code into a multiplexed code and a variable length code demultiplexer that demultiplexes the multiplexed code into a plurality of output codes. Particularly, it relates to a variable length code multiplexer suitable for transmitting a multiplexed code by way of a path onto which bit errors can be piggybacked, and a variable length code demultiplexer that pairs up with the variable length code multiplexer.

2. Description of Related Art

A variable length code, such as a Huffman code, is often used to compress various multimedia signals such as a musical sound, a voice, a still picture, and a moving picture, into a small amount of information. Huffman codes are typical variable length codes having a feature that their code length becomes short when they have a frequently used value and becomes long otherwise.

In a sound encoder and a sound decoder disclosed in "ITU-T Recommendation G.722.1" (in September, 1999), a Huffman code is used as a part of codes in order to reproduce an excellent sound signal even when those codes have a small amount of information, and the sound encoder includes a variable length code multiplexer for multiplexing the plurality of codes including the variable length code into a multiplexed code and the sound decoder includes a variable length code demultiplexer for demultiplexing the multiplexed code into the plurality of codes.

FIG. 10 is a block diagram showing the structure of the prior art sound encoder including the variable length code multiplexer, as disclosed in the above-mentioned reference. In the figure, reference numeral 1 denotes an encoding unit for encoding a sound signal 101 so as to produce and output a plurality of input codes 102, and reference numeral 2 denotes a multiplexing unit, which is disposed as the variable length code multiplexer, for multiplexing the plurality of input codes 102 into a multiplexed code 121 so that they are running in a forward direction and for outputting the multiplexed code 121. An envelope code 102-1, a category code 102-2, and a plurality of band-by-band codes 102-3 are included in the plurality of input codes 102 output by the encoding unit 1.

In the multiplexing unit 2 of FIG. 10, reference numeral 22 denotes a forward direction multiplexing unit that stores the plurality of input codes 102, i.e., the envelope code 102-1, the category code 102-2, and the plurality of band-by-band codes 102-3 one by one in a memory 24 so that they are running in a forward direction from a head of the memory 24 to a tail of the memory 24 in that order. The multiplexing unit 2 consists of the forward direction multiplexing unit 22 and the memory 24 for temporarily storing the multiplexed code 121.

FIG. 11 is a block diagram showing the structure of the prior art sound decoder including the variable length code demultiplexer, as disclosed in the above-mentioned reference. In the figure, reference numeral 5 denotes a demultiplexing unit, which is disposed as the variable length code demultiplexer, for demultiplexing the multiplexed code 121 from the sound encoder into a plurality of output codes 103 so that they are separated from locations of a memory running in the forward direction and for outputting them, and reference numeral 6 denotes a decoding unit for decoding the plurality of output codes 103 so as to reproduce and output a sound signal 101. The envelope code 102-1, the category code 102-2, and the plurality of band-by-band codes 102-3 are included in the plurality of output codes 103 output from the demultiplexing unit 5.

Furthermore, in the demultiplexing unit 5 of FIG. 11, reference numeral 51 denotes a memory for temporarily storing the multiplexed code 121, and reference numeral 52 denotes a forward direction demultiplexing unit for reading the plurality of output codes 103, i.e., the envelope code 102-1, the category code 102-2, and the plurality of band-by-band codes 102-3 one by one so that they are separated from locations running in the forward direction from a head of the memory 51 to a tail of the memory 51 in order to demultiplex the multiplexed code 121 stored in the memory 51 into the plurality of output codes 103. The demultiplexing unit 5 consists of the memory 51 and the forward direction demultiplexing unit 52.

Next, a description will be made as to the operation of the prior art sound encoder and the operation of the prior art sound decoder. The prior art sound encoder shown in FIG. 10 performs all processes on a frame-by-frame basis, each frame having a length of 20 ms. When a sound signal 101 is input to the encoding unit 1, the encoding unit 1 performs a modulated lapped transform (MLT) on the sound signal 101 so as to acquire MLT coefficients and divides these MLT coefficients into a plurality of regions. The encoding unit 1 then calculates a mean value of the MLT coefficients for each region and variable length encodes (Huffman encodes) an amplitude envelope which consists of a plurality of acquired mean values so as to output the coded amplitude envelope as the envelope code 102-1.

The encoding unit 1 then normalizes the MLT coefficients for each region with a value obtained by decoding the envelope code 102-1, quantizes the normalized MLT coefficients for each region, and acquires a fixed length code of length which is fixed for each quantization. The encoding unit 1 Huffman-encodes this fixed length code and outputs the acquired variable length code as each band-by-band code 102-3.

The encoding unit 1 determines and outputs the category code 102-2 of a fixed length for controlling the quantization stepsize for each region so that the total code length of the envelope code 102-1 and the band-by-band codes 102-3 is equal to or less than a fixed value. When the total code length is not equal to or less than the fixed value for all candidates for the category codes 102-2, the encoding unit 1 selects a candidate for the category code 102-2 that minimizes the total code length.

The envelope code 102-1, the category code 102-2, and the plurality of band-by-band codes 102-3, which are the plurality of input codes 102 output from the encoding unit 1, are input to the multiplexing unit 2, which is disposed as the variable length code multiplexer. The memory 24 in the multiplexing unit 2 is a temporary memory used for forming the multiplexed code 121, and has a storage area of a fixed length which depends on the encoding unit 1. Every time a plurality of input codes 102 are input to the multiplexing unit 2, the memory 24 is so initialized as to have a storage area of a fixed value.

The forward direction multiplexing unit 22 in the multiplexing unit 2 stores the envelope code 102-1, the category code 102-2, and the plurality of band-by-band codes 102-3 applied thereto in the memory 24 one by one so that they are running in the forward direction from the head of the memory 24 to the tail of the memory 24. Since the tail of the memory 24 is fixed, the forward direction multiplexing unit 22 does not store any other code after the forward direction multiplexing unit 22 stores the envelope code 102-1, the category code 102-2, and the plurality of band-by-band codes 102-3 one by one in the memory 24 and the location in which further data is to be stored in the memory reaches the tail of the memory.

When the forward direction multiplexing unit 22 completes the storing process, the multiplexing unit 2 outputs a value stored in the storage area extending from the head of the memory 24 to the tail of the memory 24 as the multiplexed code 121.

The memory 51 in the demultiplexing unit 5 in FIG. 11 has a storage area of the same length as that of the memory 24 in the multiplexing unit 2 shown in FIG. 10, and stores the multiplexed code 121 output from the multiplexing unit 2 therein.

The forward direction demultiplexing unit 52 in the demultiplexing unit 5 demultiplexes the multiplexed code into the envelope code 102-1, the category code 102-2, and the plurality of band-by-band codes 102-3 one by one by reading them bit by bit so that they are separated from locations of the memory 51 running in the forward direction from the head of the memory 51 to the tail of the memory 51, and outputs them to the decoding unit 6 as a plurality of output codes 103.

The decoding unit 6 decodes the envelope code 102-1 so as to calculate an amplitude envelope, calculates a quantization stepsize based on the category code 102-2, decodes each band-by-band code 102-3 based on this quantization stepsize, calculates normalized frequency domain coefficients (e.g., normalized MLT coefficients), denormalizes the frequency domain coefficients by multiplying the value of the amplitude envelope for each region by the normalized frequency domain coefficients for each region, and performs a frequency to time domain transformation, such as an Inverse MLT (IMLT), on the denormalized frequency domain coefficients so as to reproduce a sound signal 101.

FIG. 12 is a diagram showing the structure of the multiplexed code 121 processed by the prior art variable length code multiplexer and the prior art variable length code demultiplexer. As shown in the figure, the envelope code 102-1, the category code 102-2, and the plurality of band-by-band codes 102-3 numbered (1) through (14) are multiplexed into a fixed area of the multiplexed code 121. The band-by-band code 102-3 numbered (1) is the one for the region of the lowest frequency. The higher number is assigned to each of the plurality of band-by-band codes 102-3, the higher frequency region each of the plurality of band-by-band codes 102-3 corresponds to. In FIG. 12, "HEAD" indicates the head of the multiplexed code 121, and "TAIL" indicates the tail of the multiplexed code 121.

The forward direction multiplexing unit 22 in FIG. 10 stores the envelope code 102-1 bit by bit in the memory 24 so that it is running in the forward direction toward the tail of the memory 24, by defining the head of the memory 24 as a start location. The forward direction multiplexing unit 22 then defines the next bit position next to the end location in which the envelope code 102-1 is stored, as the next start location in which the category code 102-2 is to be stored, and stores the category code 102-2 bit by bit in the memory 24 so that it is running in the forward direction toward the tail of the memory 24. The forward direction multiplexing unit 22, in turn, stores the plurality of band-by-band codes 102-3 numbered (1) through (14) one by one in the memory 24 so that they are running in the forward direction toward the tail of the memory 24 in the order of the numbers (1) to (14).

The multiplexing unit 2 thus multiplexes all of the envelope code 102-1, the category code 102-2, and the plurality of band-by-band codes 102-3 into the multiplexed code 121 as shown in FIG. 12 so that they are running in the forward direction from the head of the multiplexed code 121 to the tail of the multiplexed code 121 in that order.

The forward direction demultiplexing unit 52 as shown in FIG. 11 separates the envelope code 102-1 from the multiplexed code 121, as shown in the FIG. 12, stored in the memory 51 by reading it bit by bit from locations of the memory 51 running in the forward direction toward the tail of the memory 51 by defining the head of the memory 51 as the start location. In the case of demultiplexing of a Huffman code, it is determined that a location where a series of bits read out of the memory matches up with any one of elements included in an encoding table used for the Huffman coding is the boundary between the Huffman code and another code.

The forward direction demultiplexing unit 52 then defines the next bit position next to the end location from which the envelope code 102-1 is to be separated as the start location, and separates the category code 102-2 by reading a fixed number of bits from locations of the memory 51 running in the forward direction toward the tail of the memory 51. The forward direction multiplexing unit 22, in turn, separates the plurality of band-by-band codes 102-3 numbered (1) through (14) one by one from locations of the memory 51 running in the forward direction toward the tail of the memory 51 in the order of the numbers (1) to (14).

The forward demultiplexing unit 52 thus demultiplexes the multiplexed code 121 stored in the memory 51 into the envelope code 102-1, the category code 102-2, and the plurality of band-by-band codes 102-3 by reading them one by one from locations of the memory running in the forward direction from the head of the memory 51 to the tail of the memory 51 in that order.

When a bit error occurs in a bit position designated by X, as shown in FIG. 12, the band-by-band code 102-3 numbered (4) separated by the prior art variable length code demultiplexer differs from the original one multiplexed by the variable length code multiplexer. Since a Huffman code is used as each of the plurality of band-by-band codes 102-3, the code length of the band-by-band code 102-3 numbered (4) can be erroneously estimated with a considerable probability. As a result, since the forward direction demultiplexing unit 52 cannot separate the band-by-band codes 102-3 numbered (5) through (14), which follows the one numbered (5), from correct locations of the multiplexed code, the following codes separated by the forward direction demultiplexing unit 52 become erroneous ones. These erroneously decoded regions are hatched in FIG. 12.

International publication No. WO92/19074 discloses another prior art variable length code multiplexer and another prior art variable length code demultiplexer, which differ from the ones mentioned above, respectively. The prior art variable length code multiplexer disclosed in that international patent publication counts the length of data generated through variable length coding, and time-division-multiplexes information on the data length into variable length coded data, thereby, even if an error, which is beyond the ability to make an error correction, occurs, preventing the error from exerting an influence upon following blocks (frames in this case). This prior art variable length code multiplexer performs only forward direction multiplexing.

A problem with prior art variable length code multiplexers and prior art variable length code demultiplexers constructed as above is therefore that when a bit error occurs without any application of any error correction code, or when a bit error, which is beyond the ability to make an error correction, occurs even if an error correction code is used, it is impossible to correctly demultiplex codes multiplexed behind a location at which the bit error occurs, and, in the worst case, the range affected by the occurrence of the bit error gets broadened and therefore all codes in the same frame are erroneously separated because multiplexing and demultiplexing are carried out only with respect to the forward direction.

SUMMARY OF THE INVENTION

The present invention is proposed to solve the above-mentioned problems, and it is therefore an object of the present invention to provide a variable length code multiplexer that can reduce the number of codes which cannot be correctly separated because of the occurrence of bit errors, and that can generate a multiplexed code having higher bit error immunity compared with the prior art, and a variable length code demultiplexer that demultiplexes the multiplexed code having higher bit error immunity compared with the prior art.

In accordance with an aspect of the present invention, there is provided a variable length code multiplexer including a forward direction multiplexing unit for multiplexing the plurality of input codes one by one in a forward direction from a head of the multiplexed code to a tail of the multiplexed code, a backward direction multiplexing unit for multiplexing the plurality of input codes one by one in a backward direction from the tail of the multiplexed code to the head of the multiplexed code, and a selection unit for selecting either the forward direction multiplexing unit or the backward direction multiplexing unit for each of the plurality of input codes. As a result, the present invention offers an advantage of being able to narrow the range affected by the occurrence of bit errors, and to produce a multiplexed code having higher bit error immunity.

In accordance with another aspect of the present invention, there is provided a variable length code demultiplexer including a forward direction demultiplexing unit for demultiplexing a multiplexed code into a plurality of output codes one by one so that they are separated from respective areas of the multiplexed code running in a forward direction from a head of the multiplexed code to a tail of the multiplexed code, a backward direction demultiplexing unit for demultiplexing the multiplexed code into the plurality of output codes one by one so that they are separated from respective areas of the multiplexed code running in a backward direction from the tail of the multiplexed code to the head of the multiplexed code, and a selection unit for selecting either the forward direction demultiplexing unit or the backward direction demultiplexing unit for each of the plurality of output codes. As a result, the present invention offers an advantage of being able to narrow the range affected by the occurrence of bit errors, and to produce a multiplexed code having higher bit error immunity.

Further objects and advantages of the present invention will be apparent from the following description of the preferred embodiments of the invention as illustrated in the accompanying drawings.

DETAILED DESCRIPTION OF THE PREFERRED EMBODIMENTS

The invention will now be described with reference to the accompanying drawings.

Embodiment 1

Figure 1:
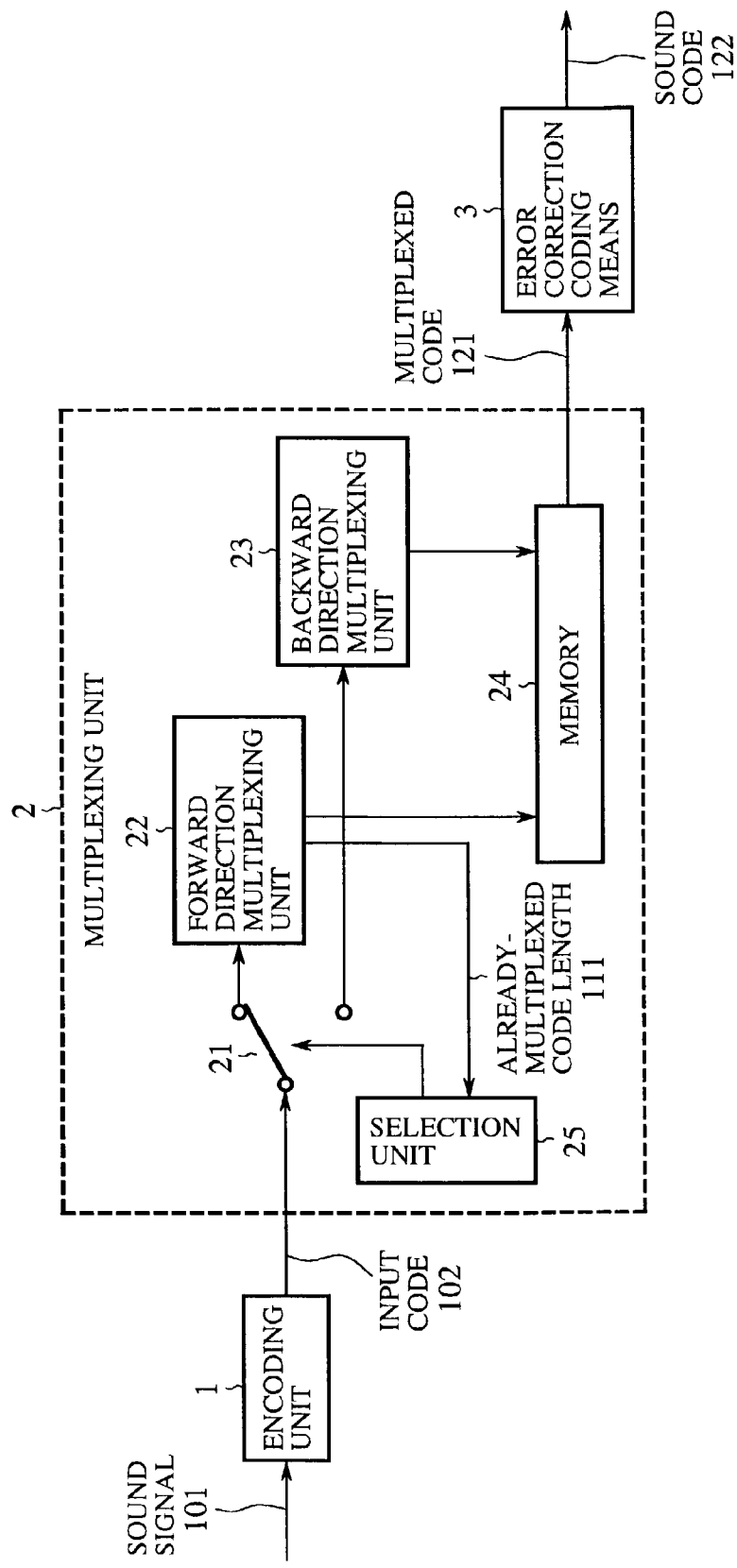
FIG. 1 is a block diagram showing the structure of a sound encoder including a variable length code multiplexer according to embodiment 1 of the present invention.
Figure 10:
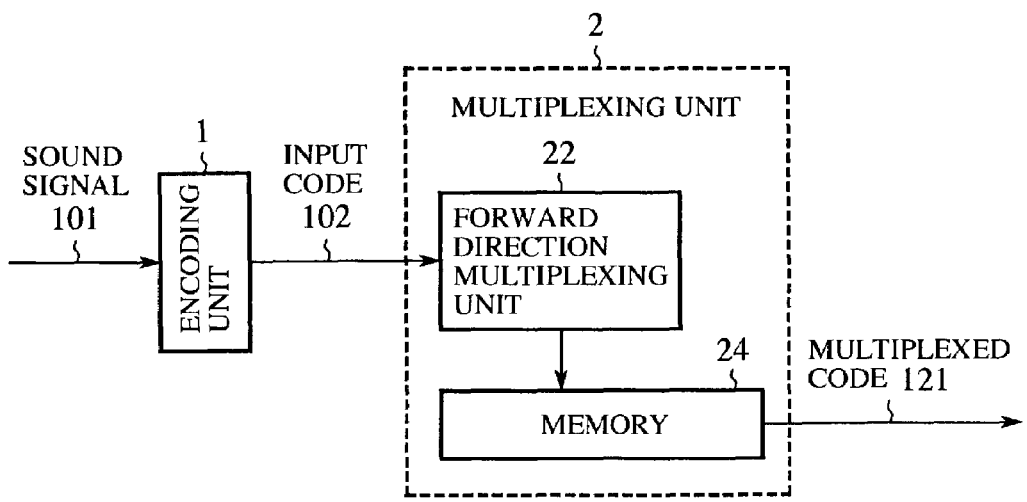
FIG. 10 is a block diagram showing the structure of a sound encoder including a prior art variable length code multiplexer.
Figure 11:
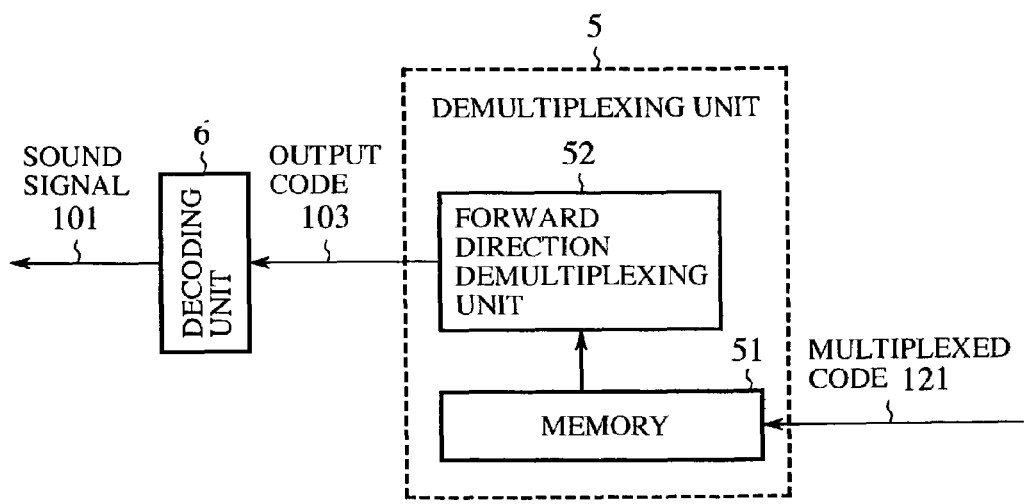
FIG. 11 is a block diagram showing the structure of a sound decoder including a prior art variable length code demultiplexer.

FIG. 1 is a block diagram showing the structure of a sound encoder including a variable length code multiplexer according to embodiment 1 of the present invention. In the figure, reference numeral 1 denotes an encoding unit that is the same as the prior art one as shown in FIG. 10, and that encodes a sound signal 101 so as to output a plurality of input codes 102: an envelope code 102-1, a category code 102-2, and a plurality of band-by-band codes 102-3.

Furthermore, in FIG. 1, reference numeral 2 denotes a multiplexing unit, which is disposed as the variable length code multiplexer and which multiplexes bits of each of the plurality of input codes 102 to produce a multiplexed code 121 so that they are running in a forward direction or a backward direction in the multiplexed code 121, and reference numeral 3 denotes an error correction coding unit that acquires an error correction code for the multiplexed code 121, adds it to the multiplexed code 121, and outputs the multiplexed code 121 having the error correction code added thereto as a sound code 122.

In addition, in the multiplexing unit 2 of FIG. 1, reference numeral 21 denotes a switch for switching the destination of each of the plurality of input codes 102 between a forward direction multiplexing unit 22 and a backward direction multiplexing unit 23. The forward direction multiplexing unit 22 multiplexes bits of an input code 102 from the switch 21 bit by bit into the multiplexed code 121 so that they are running in the forward direction from a head of a memory 24, i.e., a head of the multiplexed code 121 to a tail of the memory 24, i.e., a tail of the multiplexed code 121, and outputs an already-multiplexed code length 111, which is the length of input codes which have already been multiplexed into the multiplexed code. The backward direction multiplexing unit 23 multiplexes bits of an input code 102 from the switch 21 bit by bit so that they are running in the backward direction from the tail of the memory 24, i.e., the tail of the multiplexed code 121 to the head of the memory 24, i.e., the head of the multiplexed code 121. In addition, in the multiplexing unit 2 of FIG. 1, reference numeral 25 denotes a selection unit for causing the switch 21 to switch the destination of each of the plurality of input codes 102 between the forward direction multiplexing unit 22 and the backward direction multiplexing unit 23 according to the already-multiplexed code length 111 from the forward direction multiplexing unit 22.

Thus, the multiplexing unit 2 consists of the switch 21, the forward direction multiplexing unit 22, the backward direction multiplexing unit 23, the memory 24, and the selection unit 25.

Figure 2:
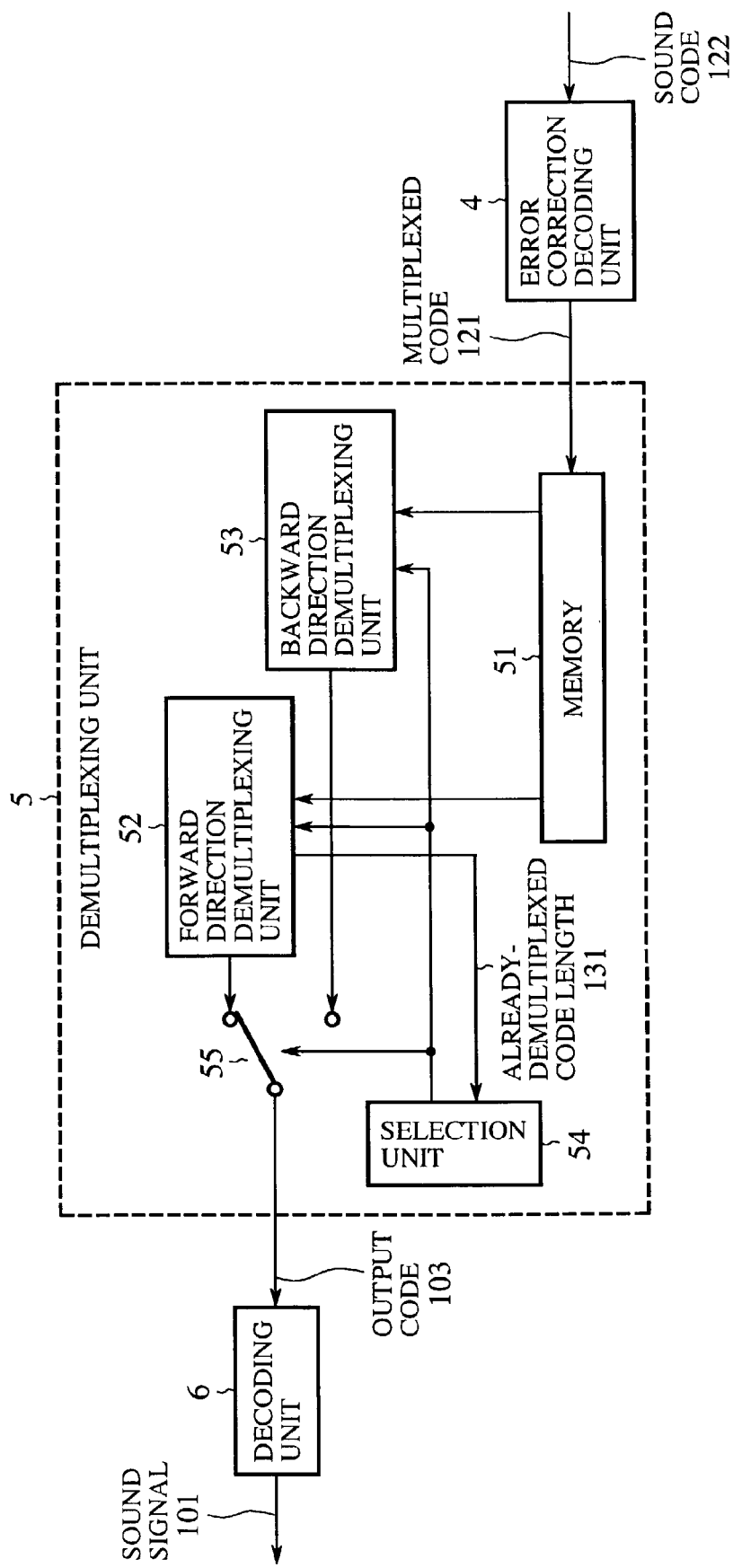
FIG. 2 is a block diagram showing the structure of a sound decoder including a variable length code demultiplexer according to embodiment 1 of the present invention.

FIG. 2 is a block diagram showing the structure of a sound decoder including a variable length code demultiplexer according to embodiment 1 of the present invention. In the figure, reference numeral 4 denotes an error correction decoding unit that makes an error correction to the sound code 122 applied thereto from the sound encoder of FIG. 1 by using an error correction code separated from the sound code 122 and outputs the multiplexed code 121 separated from the sound code 122.

Furthermore, in FIG. 2, reference numeral 5 denotes a demultiplexing unit which is disposed as the variable length code demultiplexing unit and which demultiplexes the multiplexed code 121 into the envelope code 102-1, the category code 102-2, and the plurality of band-by-band codes 102-3, which are a plurality of output codes 103, one by one so that bits of each of them are separated from respective locations of the multiplexed code, which are running in the forward direction or the backward direction, and outputs the plurality of output codes 103, and reference numeral 6 denotes a decoding unit for decoding the plurality of output codes 103 and for reproducing and outputting a sound signal 101.

In addition, in the demultiplexing unit 5 of FIG. 2, reference numeral 51 denotes a memory for temporarily storing the multiplexed code 121 separated from the sound code 122, and reference numeral 52 denotes a forward direction demultiplexing unit for demultiplexing the multiplexed code 121 stored in the memory 51 into the envelope code 102-1, the category code 102-2, and the plurality of band-by-band codes 102-3 one by one so that bits of each of them are separated from respective locations running in the forward direction from a head of the memory 51, i.e., the head of the multiplexed code 121 to a tail of the memory 51, i.e., the tail of the multiplexed code 121, and for outputting each separated code as an output code 103 and an already-demultiplexed code length which is the length of codes which have already been separated from the multiplexed code 121, and reference numeral 53 denotes a backward direction demultiplexing unit for demultiplexing the multiplexed code 121 stored in the memory 51 into the envelope code 102-1, the category code 102-2, and the plurality of band-by-band codes 102-3 one by one so that bits of each of them are separated from respective locations running in the backward direction from the tail of the memory 51, i.e., the tail of the multiplexed code 121 to the head of the memory 51, i.e., the head of the multiplexed code 121, and for outputting each separated code as an output code 103.

Furthermore, in the demultiplexing unit 5 of FIG. 2, a selection unit 54 enables either the forward direction demultiplexing unit 52 or the backward direction demultiplexing unit 53 according to the already-demultiplexed code length 131 from the forward direction demultiplexing unit 52, and controls a switch 55, and the switch 55 selectively outputs an output code 103 from the forward direction demultiplexing unit 52 or from the backward direction demultiplexing unit 53 to the decoding unit 6 according to a control signal from the selection unit 54.

Thus, the demultiplexing unit 5 consists of the memory 51, the forward direction demultiplexing unit 52, the backward direction demultiplexing unit 53, the selection unit 54, and the switch 55.

Next, a description will be made as to the operation of the sound encoder and the operation of the sound decoder in accordance with embodiment 1. The sound encoder performs encoding processing on a frame-by-frame basis, each frame having a predetermined length of 20 ms, for example. When a sound signal 101 is input to the encoding unit 1, the encoding unit 1 performs a time to frequency domain transformation, such as a modulated lapped transform (MLT), on the sound signal 101 so as to acquire frequency domain coefficients and divides these frequency domain coefficients into a plurality of portions provided for a plurality of regions, respectively. The encoding unit 1 then calculates a mean value of the frequency domain coefficients for each region and variable-length-encodes (Huffman-encodes) an amplitude envelope that consists of a plurality of acquired mean values so as to output the coded amplitude envelope as the envelope code 102-1.

The encoding unit 1 then normalizes the frequency domain coefficients for each region with a value obtained by decoding the envelope code 102-1, quantizes the normalized frequency domain coefficients for each region, and acquires a fixed length code of length which is fixed for each quantization. The encoding unit 1 Huffman-encodes this fixed length code and outputs the acquired variable length code as the band-by-band code 102-3 for each region.

The encoding unit 1 further determines and outputs the category code 102-2 of a fixed length for controlling the quantization stepsize for each region so that the total code length of the envelope code 102-1 and the band-by-band code 102-3 for each region is equal to or less than a fixed value. When the total code length is not equal to or less than a fixed value for all candidates for the category codes 102-2, the encoding unit 1 selects a candidate for the category code 102-2 that minimizes the total code length.

The envelope code 102-1, the category code 102-2, and the plurality of band-by-band codes 102-3, which are the plurality of input codes 102 output from the encoding unit 1, are input to the multiplexing unit 2, which is disposed as the variable length code multiplexer, one by one in that order. In other words, when the number of regions is 14, the sixteen input codes 102 in total: the envelope code 102-1, the category code 102-2, and the band-by-band codes 102-3 numbered (1) through (14) are input in this order.

The memory 24 in the multiplexing unit 2 is a temporary memory used for forming the multiplexed code 121, and its storage area has a fixed length which depends on the encoding unit 1. Each bit of the memory 24 is initialized on a frame-by-frame basis so that it has a fixed value.

The selection unit 25 in the multiplexing unit 2 controls the switch 21 in the multiplexing unit 2 so as to furnish each input code 102 to the forward direction multiplexing unit 22 when the already-multiplexed code length 111 output from the forward direction multiplexing unit 22 is less than the code length of the target to be protected by the error correction coding unit 3. In contrast, when the already-multiplexed code length 111 is equal to or greater than the code length of the target to be protected by the error correction coding unit 3, the selection unit 25 controls the switch 21 in the multiplexing unit 2 so as to alternately furnish each input code 102 to either the forward direction multiplexing unit 22 or the backward direction multiplexing unit 23 every time each input code 102 is applied to the switch 21.

The forward direction multiplexing unit 22 in the multiplexing unit 2 holds a value specifying a start location from which each input code 102 is to be stored in the memory 24. The forward direction multiplexing unit 22 stores all bits of each input code 102 one by one in respective locations of the memory 24, starting from the start location and running in the forward direction toward the tail of the memory 24. In other words, the forward direction multiplexing unit 22 multiplexes all bits of an input code into the multiplexed code so that they are running in the forward direction toward the tail of the multiplexed code 121 in the order in which they are received. The forward direction multiplexing unit 22 thus performs forward direction multiplexing. The value specifying the start location is initialized on a frame-by-frame basis so that it specifies the head of the memory 24. After storing one input code 102 in the memory 24, the forward direction multiplexing unit sets the value specifying the start location for storing the following input code to be multiplexed next to the bit location next to the end location of the storage area in which the previous input code 102 is stored.

The forward direction multiplexing unit 22 then outputs the difference between the head of the memory 24 and the start location, i.e., the length of input codes which have already been multiplexed into the multiplexed code for the current frame by the forward direction multiplexing unit 22, as the already-multiplexed code length 111, to the selection unit 25. Before the selection unit 25 carries out selection for the first time, the already-multiplexed code length 111 is set to 0.

When the entire storage area extending from the head of the memory 24 to the tail of the memory 24 is filled with input codes 102 stored therein, the forward direction multiplexing unit 22 does not store any more input code 102 applied thereto after that.

The backward direction multiplexing unit 23 in the multiplexing unit 2 holds a value specifying a start location from which each input code 102 is to be stored in the memory 24. The backward direction multiplexing unit 23 stores all bits of each input code 102 one by one in respective locations of the memory 24, starting from the start location and running in the backward direction toward the head of the memory 24. In other words, the backward direction multiplexing unit 23 multiplexes all bits of an input code into the multiplexed code so that they are running in the backward direction toward the head of the multiplexed code 121 in the order in which they are received. The backward direction multiplexing unit 23 Thus performs backward direction multiplexing. The value specifying the start location is initialized on a frame-by-frame basis so that it specifies the tail of the memory 24. After storing one input code 102 in the memory 24, backward direction multiplexing unit sets the value specifying the start location for the following input code to be multiplexed next to the bit location preceding, by 1 bit, the end location of the storage area in which the previous input code 102 is stored.

When the multiplexing unit 2 completes the process of storing all the input codes 102 into the memory 24 by using both the forward direction multiplexing unit 22 and the backward direction multiplexing unit 23, the multiplexing unit 2 outputs all the data, i.e., the multiplexed code 121 stored in the storage area extending from the head of the memory 24 to the tail of the memory 24 to the error correction coding unit 3.

The error correction coding unit 3 defines an area of a predetermined length extending from the head of the multiplexed code 121 as a target to be protected, acquires an error correction code for this target to be protected, and adds the acquired error correction code to the end of the multiplexed code 121. The error correction coding unit 3 then outputs the acquired code as a sound code 122. A convolutional code, a CRC code or the like can be used as the error correction code. Interleave processing can be performed on the sound code 122 immediately before the sound code 122 is output.

The error correction decoding unit 4 of FIG. 2 demultiplexes the sound code 122 into the multiplexed code 121 and the error correction code by assuming a predetermined position of the sound code 122 to be the boundary of them, so that part of the sound code 122 placed before the predetermined position is the multiplexed code and the remainder of the sound code 122 placed behind the predetermined position is the error correction code. The error correction decoding unit 4 then makes an error correction using the error correction code by determining the predetermined area extending from the head of the multiplexed code 121 as the target to be protected, and outputs the error-corrected multiplexed code 121. When the error correction coding unit 3 shown in FIG. 1 has performed interleave processing, the error correction decoding unit 4 has to perform deinterleave processing which is the reverse of the interleave processing on the sound code 122 first.

The demultiplexing unit 5 demultiplexes the multiplexed code 121 output from the error correction decoding unit 4 into the envelope code 102-1, the category code 102-2, and the plurality of band-by-band codes 102-3, which are the plurality of output codes 103, one by one by using a method described later, and outputs them to the decoding unit 6.

The memory 51 in the demultiplexing unit 5 has a storage area having the same length as that of the memory 24 in the multiplexing unit 2 shown in FIG. 1, and stores the multiplexed code 121 output from the error correction decoding unit 4 therein.

The selection unit 54 in the demultiplexing unit 5 compares the already-demultiplexed code length 131 output from the forward direction demultiplexing unit 52 with the code length of the target to be protected by the error correction decoding unit 4, and determines whether to enable either the forward direction demultiplexing unit 52 or the backward direction demultiplexing unit 53 to operate based on this comparison result. The selection unit 54 sends an instruction to either the forward direction demultiplexing unit 52 or the backward direction demultiplexing unit 53, which has been selected, so that either the forward direction demultiplexing unit 52 or the backward direction demultiplexing unit 53 is allowed to operate, and controls the switch 55 in the demultiplexing unit 5 so that each output code 103 output from either the forward direction demultiplexing unit 52 or the backward direction demultiplexing unit 53, which has been selected, is furnished to the decoding unit 6.

Concretely, the selection unit 54 selects the forward direction demultiplexing unit 52 when the already-demultiplexed code length 131 is less than the code length of the target to be protected. In contrast, the selection unit 54 alternately selects either the forward direction demultiplexing unit 52 or the backward direction demultiplexing unit 53 every time each output code 103 is applied to the forward direction demultiplexing unit 52 and the backward direction demultiplexing unit 53 when the already-demultiplexed code length 131 is equal to or greater than the code length of the target to be protected.

The forward direction demultiplexing unit 52 in the demultiplexing unit 5 holds a value specifying a start location of the memory 51 from which the envelope code 102-1, the category code 102-2, and the plurality of band-by-band codes 102-3, as the plurality of output codes 103, are to be read one by one. When receiving an instruction from the selection unit 54, the forward direction demultiplexing unit 52 separates one output code 103 from the multiplexed code stored in the memory 51 by reading all bits of the output code bit by bit from respective locations of the memory 51, starting from the start location and running in the forward direction toward the tail of the memory 51. In other words, the forward direction demultiplexing unit 52 separates all bits of one output code from respective locations of the multiplexed code 121 running in the forward direction toward the tail of the multiplexed code 121. The forward direction demultiplexing unit 22 thus performs forward direction demultiplexing.

In the case of demultiplexing of a Huffman code, it is determined that a location where a series of bits read out of the memory matches up with any one of elements included in an encoding table used for the Huffman coding is the boundary between the Huffman code and another code.

The forward direction demultiplexing unit 52 initializes the value specifying the start location on a frame-by-frame basis so that it specifies the head of the memory 51. After separating one output code 103 from the multiplexed code stored in the memory 51, the forward direction demultiplexing unit 52 sets the value specifying the start location for the following output code to be separated next to the bit location next to the end location of the storage area from which the previous output code 103 has been separated.

The forward direction demultiplexing unit 52 then outputs the difference between the head of the memory 51 and the start location, i.e., the length of output codes which have already been separated from the multiplexed code for the current frame by the forward direction demultiplexing unit 52, as the already-demultiplexed code length 111, to the selection unit 54. Before the selection unit 54 carries out selection for the first time, the already-demultiplexed code length 131 is set to 0.

The backward direction demultiplexing unit 53 in the demultiplexing unit 5 holds a value specifying a start location of the memory 51 from which the envelope code 102-1, the category code 102-2, and the plurality of band-by-band codes 102-3, as the plurality of output codes 103, are to be read one by one. When receiving an instruction from the selection unit 54, the backward direction demultiplexing unit 53 separates one output code 103 from the multiplexed code stored in the memory 51 by reading all bits of the output code one by one from respective locations of the memory 51, starting from the start location and running in the backward direction toward the head of the memory 51. In other words, the backward direction demultiplexing unit 53 separates all bits of one output code from respective locations of the multiplexed code 121 running in the backward direction toward the head of the multiplexed code 121. The backward direction demultiplexing unit 53 thus performs backward direction demultiplexing. The backward direction demultiplexing unit 53 initializes the value specifying the start location on a frame-by-frame basis so that it specifies the tail of the memory 51. After separating one output code 103 from the multiplexed code stored in the memory 51, the backward direction demultiplexing unit 53 sets the value specifying the start location for the following output code to be separated next to the bit location preceding, by 1 bit, the end location of the storage area from which the previous output code 103 has been separated.

Thus, the envelope code 102-1, the category code 102-2, and the plurality of band-by-band codes 102-3, which are the plurality of output codes 103 output from the forward direction demultiplexing unit 52 and the backward direction demultiplexing unit 53, are output to the decoding unit 6 one by one.

The decoding unit 6 decodes the envelope code 102-1 so as to calculate an amplitude envelope, calculates a quantization stepsize based on the category code 102-2, decodes the plurality of band-by-band codes 102-3 based on this quantization stepsize, calculates normalized frequency domain coefficients (e.g., normalized MLT coefficients), denormalizes the frequency domain coefficients by multiplying the value of the amplitude envelope for each region by the normalized frequency domain coefficients for each region, and performs a frequency to time domain transformation, such as an Inverse MLT (IMLT), on the denormalized frequency domain coefficients so as to reproduce a sound signal 101.

Figure 3:
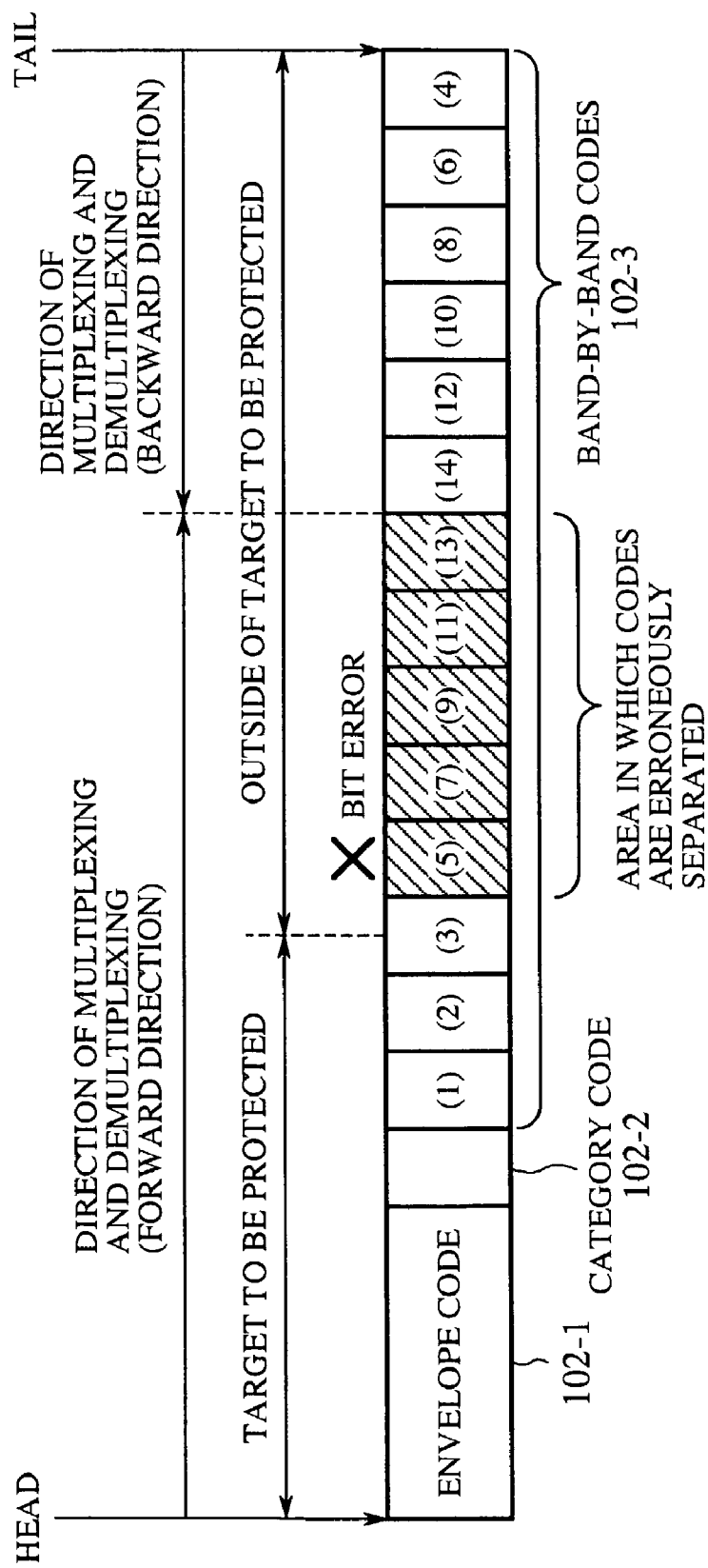
FIG. 3 is a diagram showing the structure of a multiplexed code processed by the variable length code multiplexer and variable length code demultiplexer according to embodiment 1 of the present invention.

FIG. 3 is a diagram showing the structure of the multiplexed code 121 processed by the variable length code multiplexer and variable length code demultiplexer of this embodiment 1. As shown in the figure, the envelope code 102-1, the category code 102-2, and the plurality of band-by-band codes 102-3 numbered (1) through (14) are multiplexed into a fixed area of the multiplexed code. The band-by-band code 102-3 numbered (1) is the one for the region of the lowest frequency. The higher number is assigned to each of the plurality of band-by-band codes 102-3, the higher frequency region each of the plurality of band-by-band codes 102-3 corresponds to. Since the number of bits included in the target to be protected is fixed and each code has a variable length, the number of codes included in the target to be protected varies from frame to frame.

In the case of FIG. 3, since the selection unit 25 keeps selecting the forward direction multiplexing unit 22 while the already-multiplexed code length 111 from the forward direction multiplexing unit 22 is less than the code length of the target to be protected by the error correction coding unit 3, that is, while an input code to be multiplexed next is to be placed in the target to be protected, the envelope code 102-1, the category code 102-2, and the band-by-band codes 102-3 numbered (1) through (3) are sequentially multiplexed into the multiplexed code so that they are running in the forward direction.

Since the already-multiplexed code length 111 from the forward direction multiplexing unit 22 is equal to or greater than the code length of the target to be protected, that is, the following input code to be multiplexed next is to be placed outside the target to be protected after the band-by-band code 102-3 numbered (3) has been multiplexed into the multiplexed code, the selection unit 25 alternately changes the direction of multiplexing every time each of the remaining band-by-band codes 102-3 is applied to the forward direction multiplexing unit 22 or the backward direction multiplexing unit 23.

In other words, the band-by-band code 102-3 numbered (4) is multiplexed into the multiplexed code 121 by the backward direction multiplexing unit 23 so that all bits of the code are running in the backward direction from the tail of the multiplexed code 121, the band-by-band code 102-3 numbered (5) is multiplexed into the multiplexed code 121 by the forward direction multiplexing unit 22 so that all bits of the code are running in the forward direction and it is placed behind the band-by-band code 102-3 numbered (3), and the band-by-band code 102-3 numbered (6) is multiplexed into the multiplexed code 121 by the backward direction multiplexing unit 23 so that all bits of the code are running in the backward direction and it is placed before the band-by-band code 102-3 numbered (4). When the selection unit 25 repeatedly performs this selecting process on up to the last band-by-band code 102-3 numbered (14), the multiplexed code 121 as shown in FIG. 3 is acquired.

In the case of FIG. 3, since the selection unit 54 keeps selecting the forward direction demultiplexing unit 52 while the already-demultiplexed code length 131 from the forward direction demultiplexing unit 52 is less than the code length of the target to be protected by the error correction decoding unit 4, that is, while the following code to be separated next is placed in the target to be protected, the envelope code 102-1, the category code 102-2, and the band-by-band codes 102-3 numbered (1) through (3) are sequentially separated from respective areas starting from the head of the multiplexed code and running in the forward direction.

Then, since after the band-by-band code 102-3 numbered (3) has been separated from the multiplexed code, the already-demultiplexed code length 131 from the forward direction demultiplexing unit 52 is equal to or greater than the code length of the target to be protected by the error correction decoding unit 4, that is, the following code to be separated next is placed outside the target to be protected, the selection unit 54 alternately changes the direction of demultiplexing for each of the remaining band-by-band codes 102-3.

In other words, the band-by-band code 102-3 numbered (4) is demultiplexed by the backward direction demultiplexing unit 53 so that all bits of the code are separated from respective locations running in the backward direction from the tail of the multiplexed code 121, the band-by-band code 102-3 numbered (5) is demultiplexed by the forward direction demultiplexing unit 52 so that all bits of the code are separated from respective locations running in the forward direction and placed behind the band-by-band code 102-3 numbered (3), and the band-by-band code 102-3 numbered (6) is demultiplexed by the backward direction demultiplexing unit 53 so that all bits of the code are separated from respective locations running in the backward direction and placed before the band-by-band code 102-3 numbered (4). After the selection unit 54 repeatedly performs this selecting process on up to the last band-by-band code 102-3 numbered (14), the demultiplexing of the multiplexed code 121 is completed.

Figure 12:
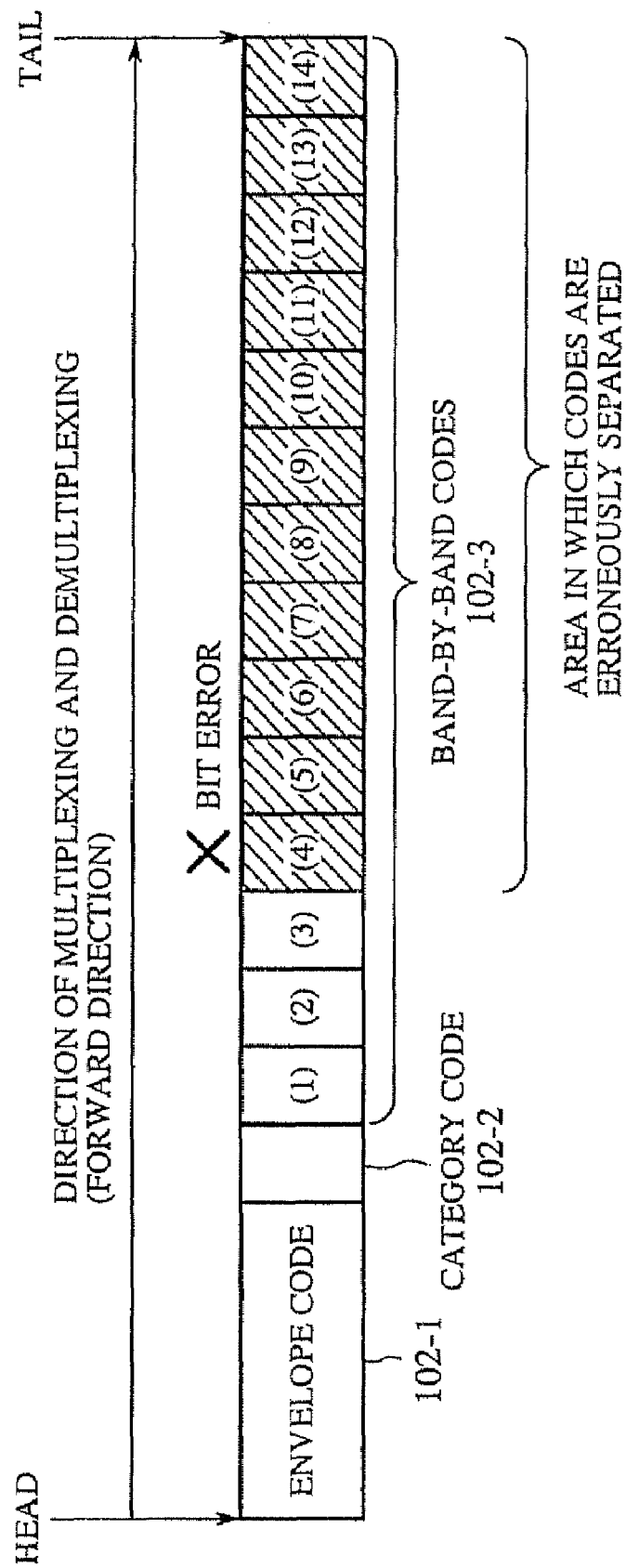
FIG. 12 is a diagram showing the structure of a multiplexed code processed by the prior art variable length code multiplexer and the prior art variable length code demultiplexer.

When a bit error occurs in the bit position (the same position as that shown in FIG. 12) designated by X, as shown in FIG. 3, the band-by-band code 102-3 numbered (5) and separated by the variable length code demultiplexer differs from the original one multiplexed by the variable length code multiplexer. Since a Huffman code is used as each of the plurality of band-by-band codes 102-3, the code length of the band-by-band code 102-3 numbered (5) can be erroneously estimated with a considerable probability. As a result, since the forward direction demultiplexing unit 52 cannot separate the band-by-band-codes 102-3 numbered (7), (9), (11), and (13), which follows the one numbered (5), from correct locations in the multiplexed code, the following codes separated by the forward direction demultiplexing unit 52 become erroneous ones. These erroneously decoded regions are hatched in FIG. 3. It is apparent from the comparison between the erroneously decoded regions as shown in FIG. 3 and those as shown in FIG. 12 that the number of erroneously decoded regions as shown in FIG. 3 is reduced to nearly the half of that as shown in FIG. 12.

Figure 4:
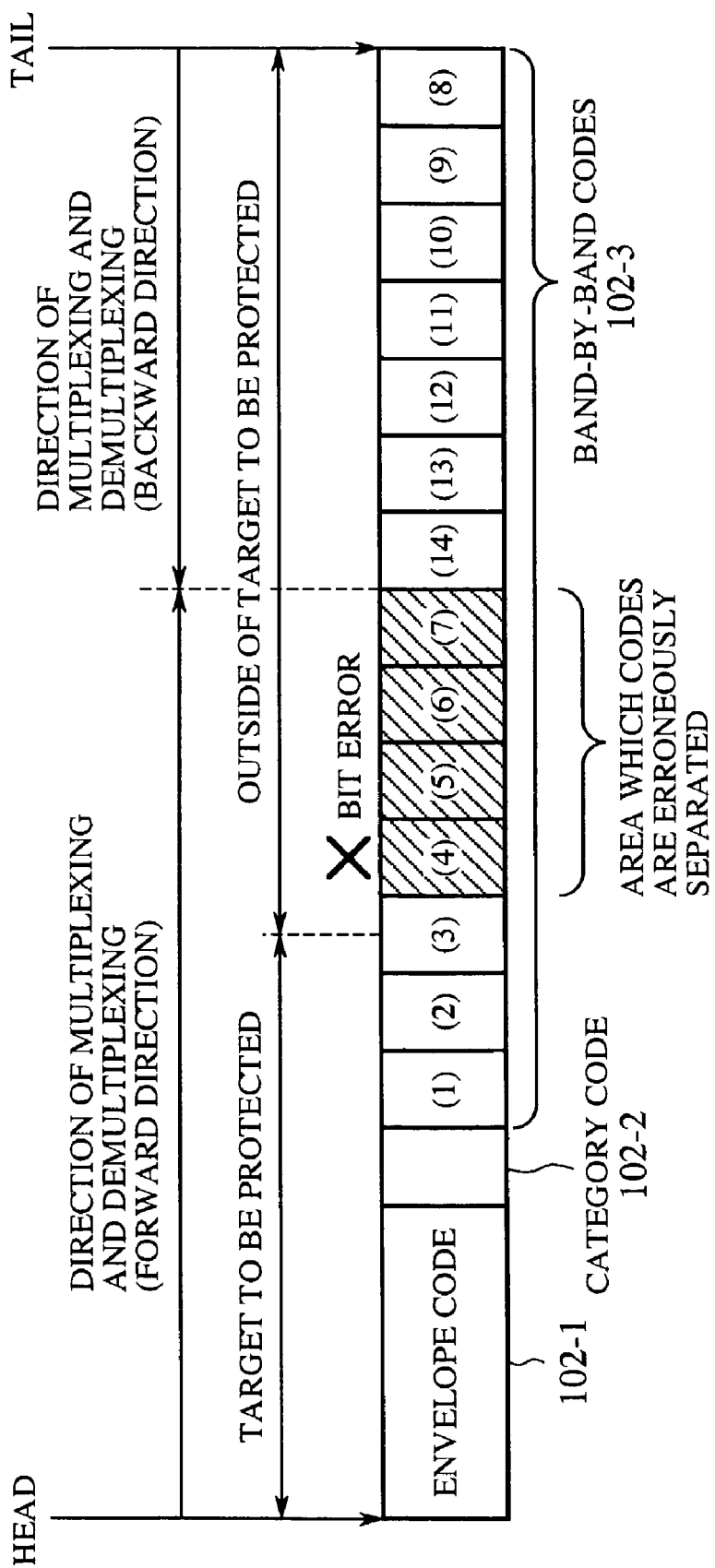
FIG. 4 is a diagram showing the structure of a multiplexed code processed by the variable length code multiplexer and variable length code demultiplexer according to embodiment 1 of the present invention.

FIG. 4 is a diagram showing the structure of another example of the multiplexed code 121 processed by the variable length code multiplexer and variable length code demultiplexer of the present embodiment. In this case, the selection unit 25 has a simpler method of selecting the direction of multiplexing, and the selection unit 54 has a simpler method of selecting the direction of demultiplexing. In other words, the selection unit 25 selects the forward direction multiplexing unit 22 for the envelope code 102-1, the category code 102-2, and the band-by-band codes 102-3 numbered (1) through (7), and selects the backward direction multiplexing unit 23 for the remaining band-by-band codes 102-3 numbered (8) through (14). Similarly, the selection unit 54 selects the forward direction demultiplexing unit 52 for the envelope code 162-1, the category code 102-2, and the band-by-band codes 102-3 numbered (1) through (7), and selects the backward direction demultiplexing unit 53 for the remaining band-by-band codes 102-3 numbered (8) through (14).

When a bit error occurs in the bit position (the same position as that shown in FIG. 12) designated by X, as shown in FIG. 4, the band-by-band codes 102-3 numbered (4) through (7) are erroneously separated. It is apparent from the comparison between the erroneously-separated regions as shown in FIG. 4 and those as shown in FIG. 12 that the number of erroneously-separated regions as shown in FIG. 4 is reduced to nearly the half of that as shown in FIG. 12.

The combination of the variable length code multiplexer and variable length code demultiplexer of the present embodiment performs the forward direction multiplexing and demultiplexing on some codes and performs the backward direction multiplexing and demultiplexing on remaining codes by using the selection units 25 and 54 that use such a simpler selection method, thereby reducing the range affected by the occurrence of bit errors.

Figure 5:
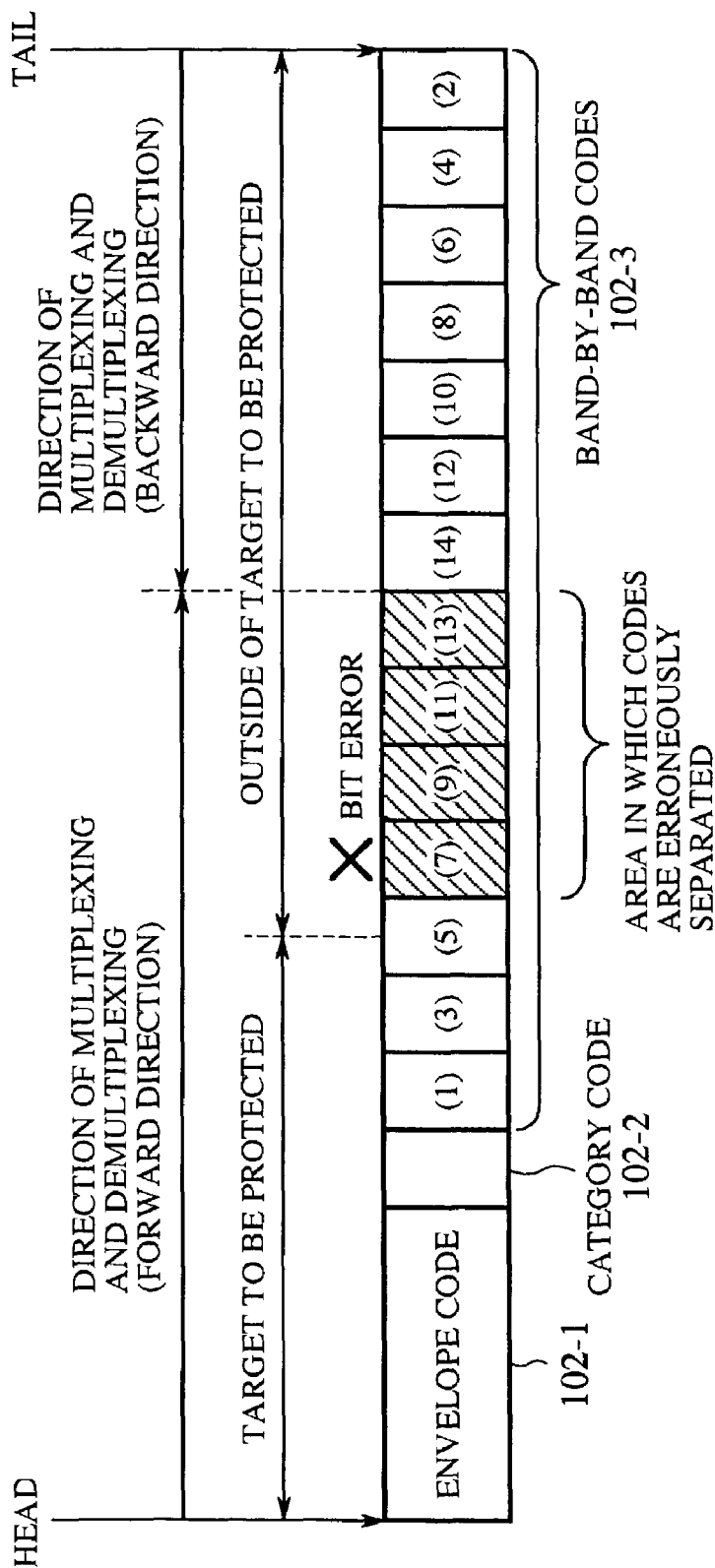
FIG. 5 is a diagram showing the structure of a multiplexed code processed by the variable length code multiplexer and variable length code demultiplexer according to embodiment 1 of the present invention.

FIG. 5 is a diagram showing the structure of another example of the multiplexed code 121 processed by the variable length code multiplexer and variable length code demultiplexer of the present embodiment. In this case, the selection unit 25 has another method of selecting the direction of multiplexing, and the selection unit 54 has another method of selecting the direction of demultiplexing. The selection unit 25 fixedly selects the forward direction multiplexing unit 22 for the envelope-code 102-1, the category code 102-2, and the band-by-band code 102-3 numbered (1), and alternately selects either the forward direction multiplexing unit 22 or the backward direction multiplexing unit 23 for the remaining band-by-band codes 102-3 numbered (2) through (14).

The selection unit 54 in the variable length code demultiplexer for demultiplexing the multiplexed code 121 into the envelope code 102-1, the category code 102-2, and the plurality of band-by-band codes 102-3 fixedly selects the forward direction demultiplexing unit 52 for the envelope code 102-1, the category code 102-2, and the band-by-band code 102-3 numbered (1), and alternately selects either the forward direction demultiplexing unit 52 or the backward direction demultiplexing unit 53 for the remaining band-by-band codes 102-3 numbered (2) through (14).

It is apparent from the comparison between FIG. 5 and FIG. 4 that the number of band-by-band codes 102-3, which are multiplexed so that they are running in the forward direction, and the number of band-by-band codes 102-3, which are multiplexed so that they are running in the backward direction, are both 7, whereas the set of the numbers of the band-by-band codes 102-3 in the case of FIG. 4, which are multiplexed so that they are running in the forward direction, differs from that in the case of FIG. 5, and the set of the numbers of the band-by-band codes 102-3 in the case of FIG. 4, which are multiplexed so that they are running in the backward direction, differs from that in the case of FIG. 5.

When a bit error occurs in the bit position (the same position as shown in FIG. 4) designated by X, as shown in FIG. 5, the band-by-band codes 102-3 numbered (7), (9), (11), and (13) are erroneously separated. It is apparent from the comparison with the case of FIG. 4 in which the band-by-band codes 102-3 numbered (4), (5), (6), and (7) are erroneously separated that the same number of band-by-band codes 102-3 with larger numbers are erroneously separated in the case of FIG. 5. Since the sound signal 101 has a tendency to deteriorate more greatly as band-by-band codes 102-3 with smaller numbers, i.e., of lower frequencies are erroneously separated, the sound signal 101 in the case of the multiplexed code 121 as shown in FIG. 5 has a lower degree of deterioration than that in the case of the multiplexed code 121 as shown in FIG. 4.

Although the sound signal 101 in the case of the multiplexed code 121 as shown in FIG. 5 has a higher degree of deterioration than that in the case of the multiplexed code 121 as shown in FIG. 4 if a bit error occurs in the area where some of the plurality of input codes are running in the backward direction, it can be determined from the comparison between the cases with the largest degree of deterioration in the sound signal 101 that the multiplexed code 121 in the case of FIG. 5 has higher bit error immunity because the sound signal 101 in the case of the multiplexed code 121 as shown in FIG. 5 has a lower degree of deterioration than that in the case of the multiplexed code 121 as shown in FIG. 4.

The case with the largest degree of deterioration in the sound signal 101 is the one in which the code length of the envelope code 102-1 is greater than the code length of the target to be protected and an error occurs at a location in the envelope code 102-1 which is placed outside the target to be protected. In that case, the envelope code 102-1, the category code 102-2, and the band-by-band codes numbered (1), (2), (3), (4), (5), (6), and (7) are erroneously separated in FIG. 4, whereas the envelope code 102-1, the category code 102-2, and the band-by-band codes numbered (1), (3), (5), (7), (9), (11), and (13) are erroneously separated in FIG. 5. Thus, the sound signal 101 in the case of the multiplexed code 121 as shown in FIG. 5 has a lower degree of deterioration than that in the case of the multiplexed code 121 as shown in FIG. 4, because a smaller number of band-by-band codes with small numbers are erroneously separated in the case of FIG. 5.

It is therefore understood that the influence of bit errors can be reduced by alternately switching between the forward direction of multiplexing and demultiplexing and the backward direction of multiplexing and demultiplexing by using the selection units 25 and 54.

Figure 6:
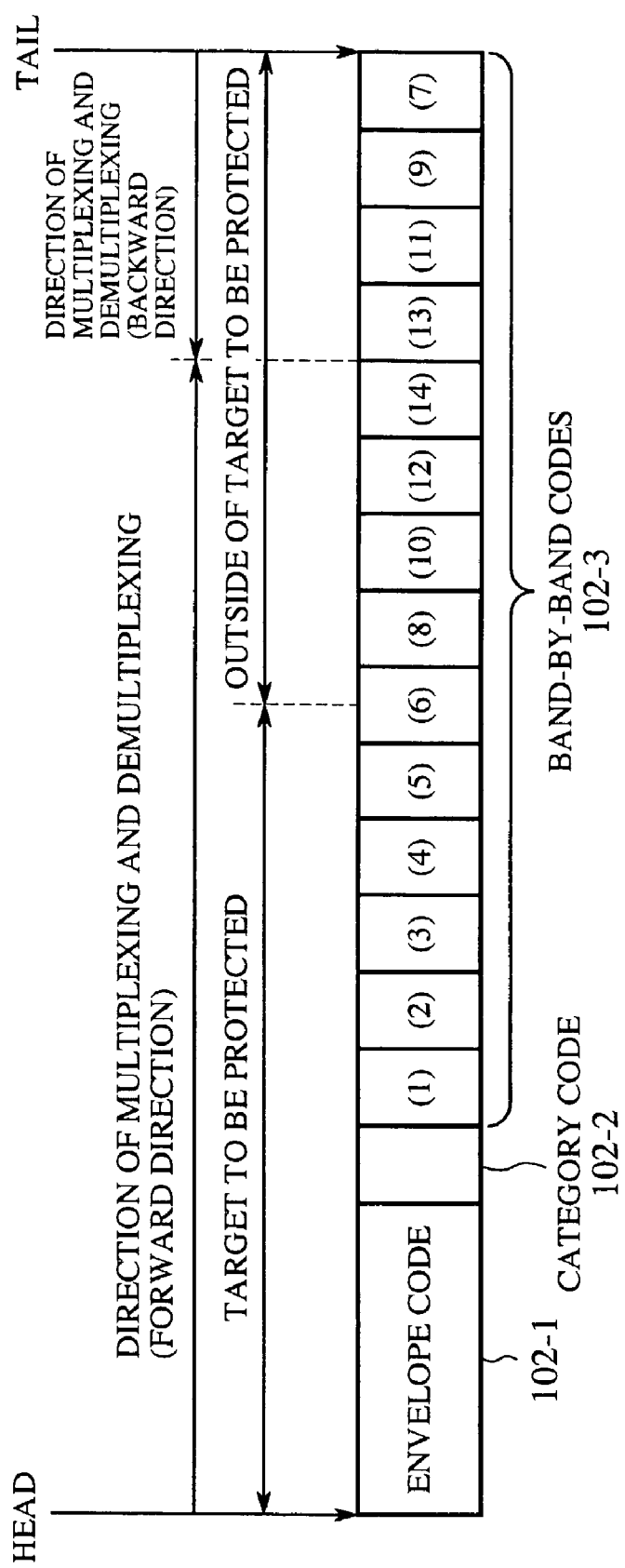
FIG. 6 is a diagram showing the structure of a multiplexed code processed by the variable length code multiplexer and variable length code demultiplexer according to embodiment 1 of the present invention.

FIG. 6 is a diagram showing the structure of another example of the multiplexed code 121 processed by the variable length code multiplexer and variable length code demultiplexer of the present embodiment. In this case, the selection unit 25 has another method of selecting the direction of multiplexing, and the selection unit 54 has another method of selecting the direction of demultiplexing. In this case, the selection unit 25 selects the forward direction multiplexing unit 22 as long as the following input code to be multiplexed next can be placed within the target to be protected, whereas the selection unit 25 alternately selects either the forward direction multiplexing unit 22 or the backward direction multiplexing unit 23 when the following code to be multiplexed next must be placed outside the target to be protected.

The selection unit 54 in the variable length code demultiplexer for demultiplexing the multiplexed code 121 selects the forward direction demultiplexing unit 52 when the code to be demultiplexed next is placed in the target to be protected, whereas the selection unit 54 alternately selects either the forward direction demultiplexing unit 52 or the backward direction demultiplexing unit 53 when the code to be demultiplexed next is placed outside the target to be protected. In other words, the multiplexed code 121 of FIG. 6 has the same structure as that processed by the variable length code multiplexer and variable length code demultiplexer of the present embodiment which are explained with reference to FIGS. 1 and 2.

The difference between FIG. 3 and FIG. 6 is the target to be protected. In other words, the target to be protected in the case of FIG. 6 has a longer code length than that in the case of FIG. 3, or the envelope code 102-1 or the like in the case of FIG. 6 has a shorter code length than that in the case of FIG. 3. In the case of FIG. 6, since a part of the band-by-band code 102-3 numbered (6) is placed within the target to be protected, the band-by-band codes 102-3 numbered (7) through (14) are multiplexed so that they are running alternately in the forward direction or the backward direction.

Hereafter, assume that a bit error occurs in the tail of the multiplexed code 121 as shown in FIGS. 5 and 6. At that time, the band-by-band codes 102-3 numbered (2), (4), (6), (8), (10), (12), and (14) are erroneously separated from the multiplexed code 121 of FIG. 5. On the other hand, the band-by-band codes 102-3 numbered (7), (9), (11), and (13) are erroneously separated from the multiplexed code 121 of FIG. 6. It is understood from the comparison between FIG. 5 and FIG. 6 that the number of band-by-band codes 102-3 erroneously separated in the case of FIG. 6 is smaller than that in the case of FIG. 5. In other words, it is noted that it is possible to narrow the maximum area in which some codes are erroneously separated from the multiplexed code 121 because of the influence of a bit error upon the codes by alternately switching between the forward direction demultiplexing and the backward direction demultiplexing only for codes to be placed outside the target to be protected.

In this embodiment, as shown in FIGS. 3, 5 and 6, some input codes 102 are multiplexed so that they are running alternately in the forward direction or the backward direction, and are demultiplexed so that they are separated alternately from respective areas of the multiplexed code running in the forward direction or the backward direction. As an alternative, all input codes 102 are multiplexed so that they are running alternately in the forward direction or the backward direction, and all codes are demultiplexed so that they are separated alternately from respective areas of the multiplexed code running in the forward direction or the backward direction. The multiplexing unit 2 and the demultiplexing unit 5 use their respective memories 24 and 51. As an alternative, the multiplexing unit 2 can use different memories for the forward direction multiplexing and for the backward direction multiplexing, and the demultiplexing unit 5 can use different memories for the forward direction demultiplexing and for the backward direction demultiplexing.

In this embodiment, the backward direction multiplexing unit 23 stores each input code bit by bit in respective locations of the memory 24 running in the backward direction from the tail of the memory 24 to the head of the memory 24. As an alternative, the backward direction multiplexing unit 23 can store each input code word by word in respective locations of the memory 24 running in the backward direction from the tail of the memory 24 to the head of the memory 24, by defining the memory 24 as a 16-bit word-based unit, for example. In other words, while the backward direction multiplexing unit 23 stores each input code word by word in respective locations of the memory 24 running in the backward direction from the tail word including the tail of the memory 24 to the head word including the head of the memory 24, the backward direction multiplexing unit 23 can store each word bit by bit so that all bits, including the most significant bit through the least significant bit, are running in the forward direction in each word, as in the case of multiplexing done by the forward direction multiplexing unit 22. In this case, the backward direction demultiplexing unit 53 has to be so constructed as to pair up with the backward direction multiplexing unit 23 so that it can perform the inverse of the multiplexing done by the backward direction multiplexing unit 23.

As mentioned above, in accordance with this embodiment, the variable length code multiplexer multiplexes 16 codes including an envelope code 102-1, a category code 102-2, and a plurality of band-by-band codes 102-3 into a multiplexed code, and the variable length code demultiplexer demultiplexes the multiplexed code into the envelope code 102-1, the category code 102-2, and the plurality of band-by-band codes 102-3. When the number of input codes increases and therefore the multiplexing and demultiplexing processing becomes complicated, it is possible to combine some codes into a single code and to perform the multiplexing and demultiplexing processing on it, and, when each of the plurality of input codes can be divided into a plurality of codes, it is also possible to perform the multiplexing and demultiplexing processing on them, respectively.

In addition, in this embodiment, the target to be protected using the error correction code is a region having a predetermined length and extending from the head of the multiplexed code 121. As an alternative, the target to be protected can be a region having a predetermined length and extending from the tail of the multiplexed code 121, or can be divided into two regions: the one in the vicinity of the head of the multiplexed code 121 and the one in the vicinity of the tail of the multiplexed code 121. Even in this case, the backward direction multiplexing unit 23 only has to output the already-multiplexed code length 111, the selection unit 25 only has to select either the forward direction multiplexing unit 22 or the backward direction multiplexing unit 23 by using this already-multiplexed code length 111, the backward direction demultiplexing unit 53 only has to output the already-demultiplexed code length 131, and the selection unit 54 only has to select either the forward direction demultiplexing unit 52 or the backward direction demultiplexing unit 53 by using this already-demultiplexed code length 131.

The variable length code multiplexer in accordance with this embodiment is included in the sound encoder for multiplexing an envelope code 102-1, a category code 102-2, and a plurality of band-by-band codes 102-3 into a multiplexed code, and the variable length code demultiplexer in accordance with this embodiment is included in the sound decoder for demultiplexing the multiplexed code into the envelope code 102-1, the category code 102-2, and the plurality of band-by-band codes 102-3. However, the present invention is not limited to the multiplexing/demultiplexing of a sound and can be applied to the multiplexing/demultiplexing of various codes obtained by encoding such a medium as a voice or an image.

As mentioned above, in accordance with this embodiment 1, the multiplexing unit 2 is provided with the forward direction multiplexing unit 22 for multiplexing each input code 102 into a multiplexed code 121 bit by bit so that all bits of each input code 102 are running in the forward direction from the head of the multiplexed code 121 to the tail of the multiplexed code 121, and the backward direction multiplexing unit 23 for multiplexing each input code 102 into the multiplexed code 121 bit by bit so that all bits of each input code 102 are running in the backward direction from the tail of the multiplexed code 121 to the head of the multiplexed code 121, and the selection unit 25 for selecting either the forward direction multiplexing unit 22 or the backward direction multiplexing unit 23 for each of the plurality of input codes 102, and the demultiplexing unit 5 is provided with the forward direction demultiplexing unit 52 for separating an output code 103 from the multiplexed code 121 so that all bits of the output code 103 are separated from respective locations running in the forward direction from the head of the multiplexed code 121 to the tail of the multiplexed code 121, the backward direction demultiplexing unit 53 for separating an output code 103 from the multiplexed code 121 so that all bits of the output code 103 are separated from respective locations running in the backward direction from the tail of the multiplexed code 121 to the head of the multiplexed code 121, and the selection unit 54 for selecting either the forward direction demultiplexing unit 52 or the backward direction demultiplexing unit 53 for each of the plurality of output codes 103. As a result, the present embodiment offers an advantage of being able to narrow the range affected by the occurrence of bit errors, and to produce the multiplexed code 121 having higher bit error immunity.

Furthermore, in accordance with this embodiment 1, the tail of the multiplexed code 121 is fixed in the multiplexing unit 2, and the tail of the multiplexed code 121 is also fixed in the demultiplexing unit 5. As a result, the present embodiment offers an advantage of being able to narrow the range affected by the occurrence of bit errors, and to produce the multiplexed code 121 having higher bit error immunity without any increase in the information on the tail of the multiplexed code 121 and a serious error propagation because of erroneously demultiplexing of the information on the tail of the multiplexed code 121.

In addition, in accordance with this embodiment 1, the selection unit 25 alternately selects either the forward direction multiplexing unit 22 or the backward direction multiplexing unit 23 for each input code 102 in the multiplexing unit 2, and the selection unit 54 alternately selects either the forward direction demultiplexing unit 52 or the backward direction demultiplexing unit 53 for each output code 103 in the demultiplexing unit 5. As a result, a series of codes is never separated erroneously from the multiplexed code by the demultiplexer, and, when a series of codes included in the multiplexed code is of importance, the deterioration of the decoding quality due to the occurrence of bit errors can be minimized. The present embodiment thus makes it possible to produce and demultiplex the multiplexed code 121 having higher bit error immunity.

Furthermore, in accordance with this embodiment 1, in the multiplexing unit 2, the forward direction multiplexing unit 22 outputs the length of codes which have already been multiplexed into the multiplexed code as the already-multiplexed code length 111, and the selection unit 25 selects either the forward direction multiplexing unit 22 or the backward direction multiplexing unit 23 based on the already-multiplexed code length 111 from the forward direction multiplexing unit 22, and in the demultiplexing unit 5, the forward direction demultiplexing unit 52 outputs the length of codes which have already been separated from the multiplexed code 121 as the already-demultiplexed code length 131, and the selection unit 54 selects either the forward direction demultiplexing unit 52 or the backward direction demultiplexing unit 53 based on the already-demultiplexed code length 131 from the forward direction demultiplexing unit 52. As a result, the area where either the forward direction multiplexing or the backward direction multiplexing is alternately selected can be limited to the outside of the target to be protected using an error correction code, and the maximum area in which some codes are erroneously separated from the multiplexed code 121 because of the influence of a bit error upon the codes can be reduced. The present embodiment thus makes it possible to produce and demultiplex the multiplexed code 121 having higher bit error immunity.

In addition, in accordance with this embodiment 1, in the multiplexing unit 2, when the already-multiplexed code length 111 from the forward direction multiplexing unit 22 is less than a predetermined value, the selection unit 25 selects the forward direction multiplexing unit 22, and in the demultiplexing unit 5, when the already-demultiplexed code length 131 from the forward direction demultiplexing unit 52 is less than the predetermined value, the selection unit 54 selects the forward direction demultiplexing unit 52. For example, when the target to be protected using an error correction code is an area of a predetermined length extending from the head of the multiplexed code 121, the area where either the forward direction multiplexing or the backward direction multiplexing is alternately selected can be limited to the outside of the target to be protected using an error correction code, and the maximum area in which some codes are erroneously separated from the multiplexed code 121 because of the influence of a bit error upon the codes can be reduced. The present embodiment thus makes it possible to produce and demultiplex the multiplexed code 121 having higher bit error immunity.

Embodiment 2

Figure 7:
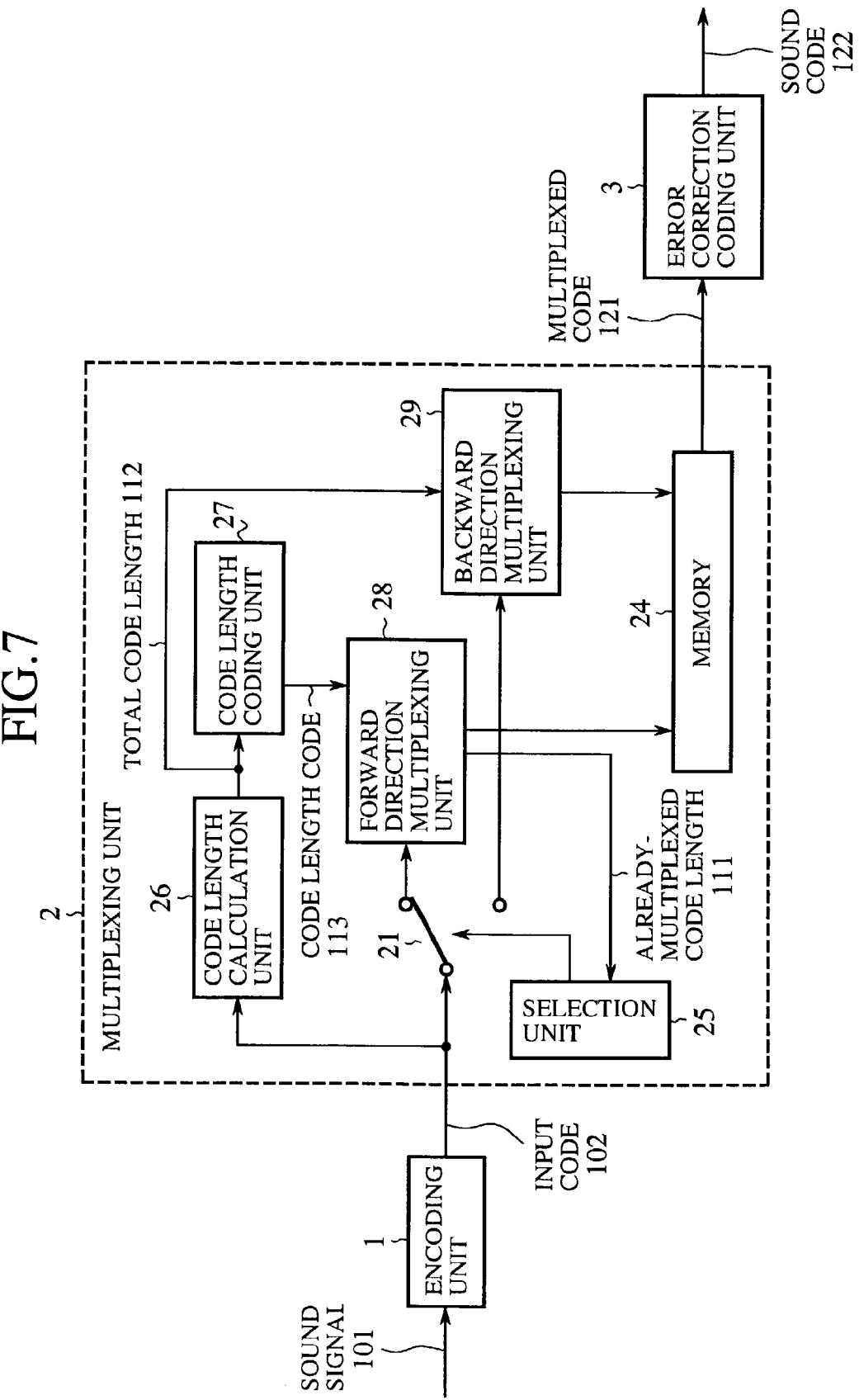
FIG. 7 is a block diagram showing the structure of a sound encoder including a variable length code multiplexer according to embodiment 2 of the present invention.

FIG. 7 is a block diagram showing the structure of a sound encoder including a variable length code multiplexer according to embodiment 2 of the present invention. In the figure, reference numeral 26 denotes a code length calculation unit for calculating a sum of the code lengths of a plurality of input codes 102 and for outputting it as a total code length 112, and reference numeral 27 denotes a code length coding unit for encoding the total code length 112 and for outputting the coded result as a code length code 113.

Furthermore, in FIG. 7, reference numeral 28 denotes a forward direction multiplexing unit for multiplexing the code length code 113 from the code length coding unit 27 and the plurality of input codes 102 from a switch 21 into a multiplexed code 121 one by one so that all bits of each of them are running in a forward direction from a head of a memory 24, i.e., a head of the multiplexed code 121 to a tail of the memory 24, i.e., a tail of the multiplexed code 121, and for outputting an already-multiplexed code length 111, which is the code length of codes which have already been multiplexed into the multiplexed code 121, and reference numeral 29 denotes a backward direction multiplexing unit for determining the tail of the multiplexed code 121 stored in the memory 24 by adding the total code length 112 from the code length calculation unit 26 to a value specifying the head of the memory 24, and for, by defining the determined tail of the multiplexed code 121 as a start location, multiplexing the plurality of input codes 102 from the switch 21 into the multiplexed code one by one so that all bits of each of them are running in a backward direction toward the head of the memory 24, i.e., the head of the multiplexed code 121. The same components as those shown in FIG. 1 are designated by the same reference numerals and the explanation of those components will be omitted hereafter. It is assumed that the memory 24 has a length long enough to store the code length code 113 and the plurality of input codes 102.

Figure 8:
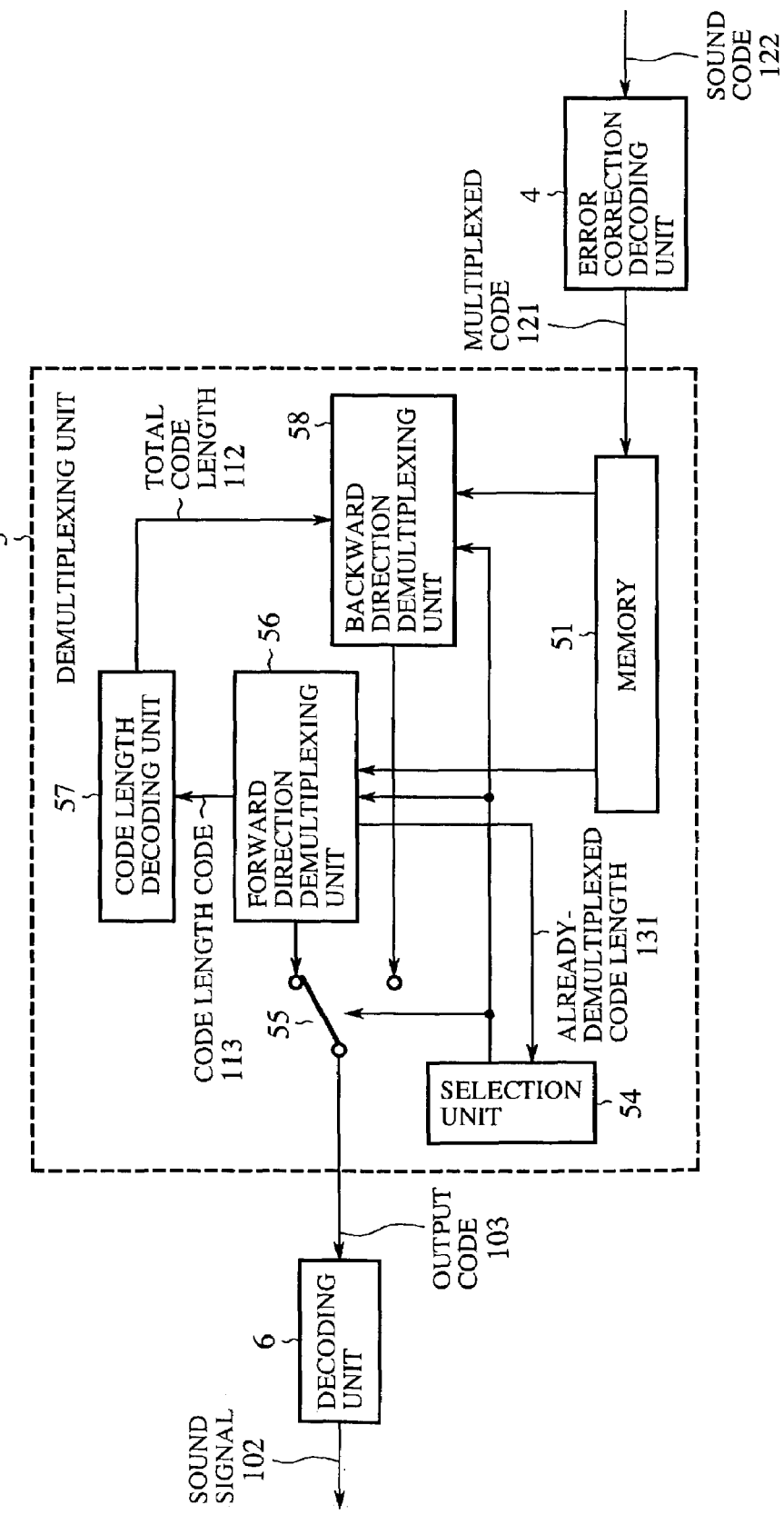
FIG. 8 is a block diagram showing the structure of a sound decoder including a variable length code demultiplexer according to embodiment 2 of the present invention.

FIG. 8 is a block diagram showing the structure of a sound decoder including a variable length code demultiplexer according to embodiment 2 of the present invention. In the figure, reference numeral 56 denotes a forward direction demultiplexing unit for demultiplexing the multiplexed code 121 stored in a memory 51 into the code length code 113 and a plurality of output codes 103 one by one so that all bits of each of them are separated from respective locations of the memory 51 running in the forward direction from a head of the memory 51, i.e., the head of the multiplexed code 121 to a tail of the memory 51, i.e., the tail of the multiplexed code 121, and for outputting an already-demultiplexed code length 131, which is the code length of codes which have already been separated from the multiplexed code 121, as well as the code length code 113 and the plurality of output codes 103.

Furthermore, in FIG. 8, reference numeral 57 denotes a code length decoding unit for decoding the code length code 113 separated by the forward direction demultiplexing unit 56 and for outputting a decoded result as a total code length 112, and reference numeral 58 denotes a backward direction demultiplexing unit for determining the tail of the multiplexed code 121 stored in the memory 51 by adding the total code length 112 from the code length decoding unit 57 to a value specifying the head of the memory 51, and for, by defining the determined tail of the multiplexed code 121 as a start location, for demultiplexing the multiplexed code 121 stored in the memory 51 into a plurality of output codes 103 one by one so that all bits of each of them are separated from respective areas of the memory 51 running in the backward direction toward the head of the memory 51, i.e., the head of the multiplexed code 121, and for outputting the plurality of output codes 103. The same components as those shown in FIG. 2 are designated by the same reference numerals and the explanation of those components will be omitted hereafter. It is assumed that the memory 51 has a length equal to that of the memory 24.

Next, a description will be made as to the operation of the sound encoder and the operation of the sound decoder. An envelope code 102-1, a category code 102-2, and a plurality of band-by-band codes 102-3, which are a plurality of input codes 102 output from the encoding unit 1, are input to the multiplexing unit 2, which is disposed as the variable length code multiplexer, one by one. In other words, when the number of regions is 14, the sixteen input codes 102 in total: the envelope code 102-1, the category code 102-2, and the plurality of band-by-band codes 102-3 numbered (1) through (14) are input in this order.

The memory 24 in the multiplexing unit 2 is a temporary memory used for forming the multiplexed code 121, and has to have a length long enough to form the multiplexed code 121. Each bit of the memory 24 is initialized to a fixed value on a frame-by-frame basis.

The code length calculation unit 26 of the multiplexing unit 2 determines the code length of each of the plurality of input codes 102 applied thereto on a frame-by-frame basis, and calculates a sum of the code lengths of the plurality of input codes and outputs the sum as the total code length 112. When the code length of each of the plurality of input codes 102 has already been obtained in the encoding unit 1, it can be used unchanged.

The code length coding unit 27 encodes the total code length 112 and outputs the acquired code as the code length code 113. When the number of possibilities of the total code length is 256 or less, for example, the total code length can be coded into a code of a fixed length of 8 bits.

The selection unit 25 in the multiplexing unit 2 controls the switch 21 in the multiplexing unit 2 so as to furnish each input code 102 to the forward direction multiplexing unit 28 when the already-multiplexed code length 111 output from the forward direction multiplexing unit 28 is less than the code length of the target to be protected by the error correction coding unit 3. In contrast, when the already-multiplexed code length 111 is equal to or greater than the code length of the target to be protected by the error correction coding unit 3, the selection unit 25 controls the switch 21 in the multiplexing unit 2 so as to alternately furnish each input code 102 to either the forward direction multiplexing unit 28 or the backward direction multiplexing unit 29 every time each input code 102 is applied thereto.

The forward direction multiplexing unit 28 in the multiplexing unit 2 stores the code length code 113 bit by bit in the memory 24 with the head of the memory 24 being set as a start location so that all bits of the code length code 113 are running in the forward direction toward the tail of the memory 24. The forward direction multiplexing unit 28 thus multiplexes the code length code 113 so that all bits of the code length code are running in the forward direction from the head of the multiplexed code 121 to the tail of the multiplexed code 121. In other words, the forward direction multiplexing unit 28 performs forward direction multiplexing. The forward direction multiplexing unit 28 in the multiplexing unit 2 holds a value specifying a start location from which an input code 102 following the code length code 113 is to be stored in the memory 24, and sets the start location so that it specifies the bit location next to the end location of the storage area in which the code length code 113 is stored when the storage of the code length code 113 is completed.

The forward direction multiplexing unit 28 then stores all bits of each input code 102 bit by bit in locations of the memory 24, starting from the start location and running in the forward direction toward the tail of the memory 24. The forward direction multiplexing unit 28 thus multiplexes each input code 102 so that all bits of each input code are running in the forward direction from the head of the multiplexed code 121 to the tail of the multiplexed code 121 in the order in which they are received. In other words, the forward direction multiplexing unit 28 performs forward direction multiplexing. After one input code 102 has been stored in the memory 24, the value specifying the start location for the following input code to be multiplexed next is set to the bit location next to the end location of the storage area in which the previous input code 102 is stored.

The forward direction multiplexing unit 28 then outputs the difference between the head of the memory 24 and the start location, i.e., the length of input codes which have already been multiplexed into the multiplexed code for the current frame by the forward direction multiplexing unit 28, as the already-multiplexed code length 111, to the selection unit 25.

The backward direction multiplexing unit 29 in the multiplexing unit 2 holds a value specifying the start location from which each input code 102 is to be stored in the memory 24. The backward direction multiplexing unit 29 stores each input code 102 bit by bit in respective locations of the memory 24, starting from the start location and running in the backward direction toward the head of the memory 24. In other words, the backward direction multiplexing unit 29 multiplexes an input code into the multiplexed code so that all bits of the input code are running in the backward direction toward the head of the multiplexed code 121 in the order in which they are received. The backward direction multiplexing unit 28 thus performs backward direction multiplexing. The backward direction multiplexing unit 29 determines the tail of the multiplexed code 121 stored in the memory 24 by adding the total code length 112 from the code length calculation unit 26 to a value specifying the head of the memory 24, and initializes the start location so that it has the value specifying the tail of the memory 24. After storing one input code 102 in the memory 24, the backward direction multiplexing unit 29 sets the start location for storing the following input code to be multiplexed next so that it specifies the bit location preceding, by 1 bit, the end location of the storage area in which the previous input code 102 is stored.

When then completing the process of storing all the input codes 102 in the memory 24 by using both the forward direction multiplexing unit 28 and the backward direction multiplexing unit 29, the multiplexing unit 2 outputs all data stored in the storage area extending from the head of the multiplexed code 121 to the tail of the multiplexed code 121 in the memory 24, i.e., the multiplexed code 121 to the error correction coding unit 3.

The demultiplexing unit 5 shown in FIG. 8 demultiplexes the multiplexed code 121 output from the error correction decoding unit 4 into the envelope code 102-1, the category code 102-2, and the plurality of band-by-band code 102-3, which are the plurality of output codes 103, one by one, and outputs those codes to the decoding unit 6.

The memory 51 in the demultiplexing unit 5 has a storage area having the same length as that of the memory 24 in the multiplexing unit 2, and stores the multiplexed code 121 output from the error correction decoding unit 4 therein.

When the multiplexed code 121 is stored in the memory 51, the forward direction demultiplexing unit 56 in the demultiplexing unit 5 reads the multiplexed code 121 bit by bit from respective locations running in the forward direction toward the tail of the memory 51 by defining the head of the memory 51 as the start location, that is, demultiplexes the multiplexed code into the code length code 113 and the plurality of output codes so that they are separated from respective areas of the multiplexed code 121 running in the forward direction from the head of the multiplexed code 121 to the tail of the multiplexed code 121, and then outputs the code length code 113 to the code length decoding unit 57. The forward direction demultiplexing unit 56 holds a value specifying the start location from which the envelope code 102-1, the category code 102-2, and the plurality of band-by-band code 102-3, as the plurality of output codes 103, are to be extracted one by one from the memory 51, and sets the start location so that it specifies the bit location next to the end location of the storage area from which the code length code 113 has been separated when the separation of the code length code 113 is completed.

The forward direction demultiplexing unit 56 then outputs the difference between the head of the memory 51 and the start location, i.e., the length of codes which have already been separated from the multiplexed code for the current frame by the forward direction demultiplexing unit 56, as the already-demultiplexed code length 131, to the selection unit 54.

The code length decoding unit 57 decodes the code length code 113 output from the forward direction demultiplexing unit 56, and outputs the decoded code length to the backward direction demultiplexing unit 58 as the total code length 112.

The selection unit 54 in the demultiplexing unit 5 compares the already-demultiplexed code length 131 output from the forward direction demultiplexing unit 56 with the code length of the target to be protected by the error correction decoding unit 4, and determines whether to enable either the forward direction demultiplexing unit 56 or the backward direction demultiplexing unit 58 based on the comparison result. The selection unit 54 sends an instruction to either the forward direction demultiplexing unit 56 or the backward direction demultiplexing unit 58, which has been selected, so that either the forward direction demultiplexing unit 56 or the backward direction demultiplexing unit 58 is allowed to operate, and controls the switch 55 in the demultiplexing unit 5 so that the output code 103 output from either the forward direction demultiplexing unit 56 or the backward direction demultiplexing unit 58, which has been selected, is furnished to the decoding unit 6.

Concretely, the selection unit 54 selects the forward direction demultiplexing unit 56 when the already-demultiplexed code length 131 is less than the code length of the target to be protected, whereas the selection unit 54 alternately selects either the forward direction demultiplexing unit 56 or the backward direction demultiplexing unit 58 every time each output code 103 is input to the decoding unit 6 when the already-demultiplexed code length 131 is equal to or greater than the code length of the target to be protected.

When receiving an instruction from the selection unit 54, the forward direction demultiplexing unit 56 separates one output code 103 from the multiplexed code 121 stored in the memory 51 by reading the output code bit by bit from respective locations of the memory 51, starting from the start location and running in the forward direction toward the tail of the memory 51. In other words, the forward direction demultiplexing unit 56 separates the output code from respective locations of the memory 51 running in the forward direction toward the tail of the memory 51, i.e., the tail of the multiplexed code 121. The forward direction demultiplexing unit 22 thus performs forward direction demultiplexing. The forward direction demultiplexing unit 56 initializes the value specifying the start location on a frame-by-frame basis so that it specifies the head of the memory 51. After one output code 103 has been separated from the multiplexed code stored in the memory 51, the value specifying the start location for the following output code to be separated next is set to the bit location next to the end location of the storage area from which the previous output code 103 has been separated.

The forward direction demultiplexing unit 56 then calculates the difference between the head of the memory 51 and the start location, i.e., the length of output codes which have already been separated from the multiplexed code for the current frame by the forward direction demultiplexing unit 56 again, and outputs it as the already-demultiplexed code length 131, to the selection unit 54.

The backward direction demultiplexing unit 58 in the demultiplexing unit 5 holds a value specifying the start location of the memory 51 from which the envelope code 102-1, the category code 102-2, and the band-by-band codes 102-3, as the plurality of output codes 103, are to be extracted one by one. When receiving an instruction from the selection unit 54, the backward direction demultiplexing unit 58 separates one output code 103 from the multiplexed code 121 stored in the memory 51 by reading the output code bit by bit from respective locations of the memory 51, starting from the start location and running in the backward direction toward the head of the memory 51. In other words, the backward direction demultiplexing unit 58 separates the output code from respective locations of the memory 51 running in the backward direction toward the head of the memory 51, i.e., the head of the multiplexed code 121. The backward direction demultiplexing unit 53 thus performs backward direction demultiplexing. The backward direction multiplexing unit 58 determines a value specifying the tail of the multiplexed code 121 stored in the memory 51 by adding the total code length 112 from the code length decoding unit 57 to a value specifying the head of the memory 51, and initializes the start location so that it has the value specifying the tail of the multiplexed code 121. After separating one output code 103 from the memory 51, the backward direction demultiplexing unit 58 sets the start location for separating the following output code to be demultiplexed next so that it specifies the bit location preceding, by 1 bit, the end location of the storage area from which the previous output code 103 has been separated.

Thus, the envelope code 102-1, the category code 102-2, and the plurality of band-by-band codes 102-3, which are the plurality of output codes 103 output from the forward direction demultiplexing unit 56 and the backward direction demultiplexing unit 58, are output to the decoding unit 6 one by one.

Figure 9:
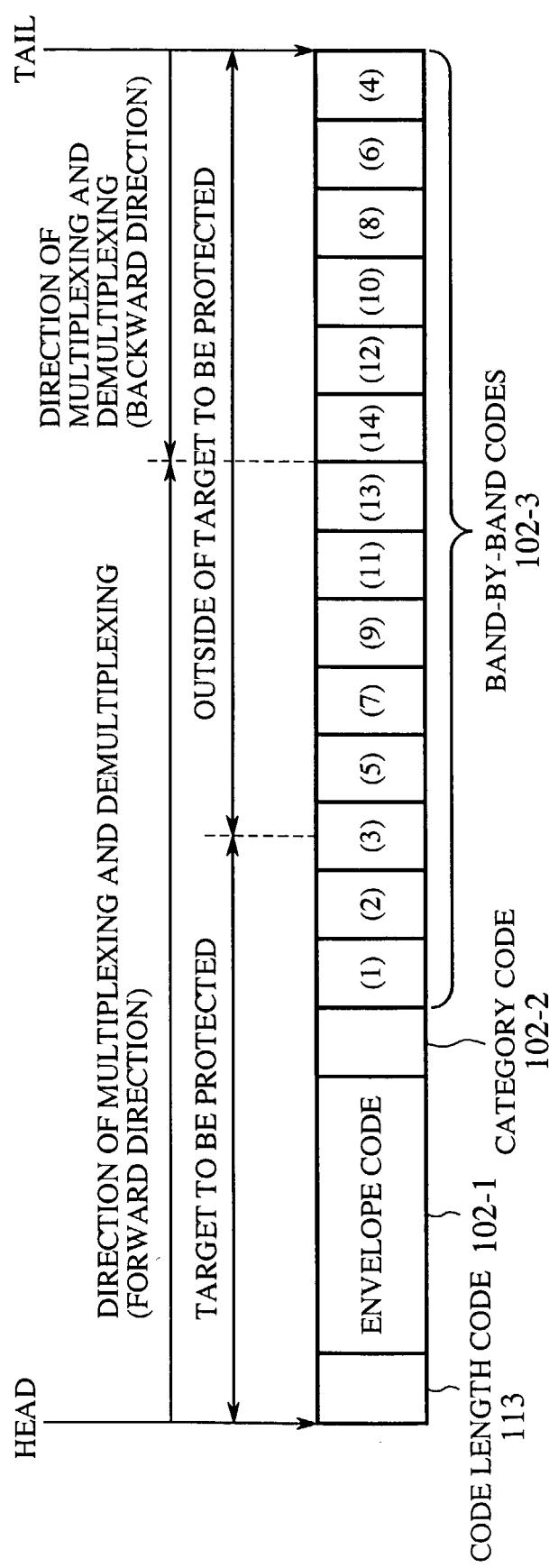
FIG. 9 is a diagram showing the structure of a multiplexed code processed by the variable length code multiplexer and variable length code demultiplexer according to embodiment 2 of the present invention.

FIG. 9 is a diagram showing the structure of the multiplexed code 121 processed by the variable length code multiplexer and variable length code demultiplexer of the present embodiment. The code length code 113, the envelope code 102-1, the category code 102-2, and the plurality of band-by-band codes 102-3 numbered (1) through (14) are multiplexed into the multiplexed code, as shown in the figure.

It is apparent from the comparison between FIG. 9 and FIG. 3 that the code length code 113 is additionally multiplexed into the head of the multiplexed code 121. While the tail of the multiplexed code 121 of FIG. 3 is fixed, the tail of the multiplexed code 121 of FIG. 9 can vary from frame to frame, not shown in the figure. Since the code length code 113 is correctly separated when one or more errors that occur in the target to be protected are completely corrected, the tail of the multiplexed code 121 of FIG. 9 is not determined erroneously.

As mentioned above, this embodiment 2 offers the same advantages as provided by embodiment 1. In addition, since the multiplexing unit 2 is provided with the code length calculation unit 26 for determining the total code length 112 for a plurality of input codes 102, the backward direction multiplexing unit 29 determines the tail of the multiplexed code 121 based on the total code length 112, the demultiplexing unit 5 is provided with the code length decoding unit 57 for determining the total code length 112 for the multiplexed code 121, and the backward direction demultiplexing unit 58 determines the tail of the multiplexed code 121 based on the total code length 112, embodiment 2 offers another advantage of, even when multiplexing the plurality of input codes 102 whose total code length varies from frame to frame, being able to narrow the range affected by the occurrence of bit errors and to improve the bit error immunity by adding a code having a short code length and concerning the total code length 112 to the multiplexed code. The present embodiment thus makes it possible to produce and demultiplex the multiplexed code 121 having higher bit error immunity.

Embodiment 3

In the variable length code multiplexers of above-mentioned embodiments 1 and 2, the multiplexing processing is carried out by switching between the forward direction multiplexing unit and the backward direction multiplexing unit according to the selection done by the selection unit 25. In contrast, in accordance with embodiment 3, after multiplexing a plurality of input codes into a multiplexed code 121 so that they are fixedly running in a forward direction, the variable length code multiplexer interchanges them in the multiplexed code 121 according to the selection done by the selection unit 25.

Similarly, in the variable length code demultiplexers of above-mentioned embodiments 1 and 2, the demultiplexing processing is carried out by switching between the forward direction demultiplexing unit and the backward direction demultiplexing unit according to the selection done by the selection unit 54. In contrast, in accordance with embodiment 3, after interchanging the plurality of codes included in the multiplexed code 121 stored in the memory 51 according to the selection done by the selection unit 53, the variable length code demultiplexer demultiplexes the multiplexed code 121 into the plurality of output codes so that they are fixedly separated from storage areas of the memory 51 running in a forward direction. The present embodiment offers the same advantages as provided by embodiments 1 and 2.

Embodiment 4

In the sound encoder of above-mentioned embodiment 2, the variable length code multiplexer transmits the total code length 112 to the variable length code demultiplexer by multiplexing the code length code 113 obtained by encoding the total code length 112 into the multiplexed code. In accordance with embodiment 4, the variable length code multiplexer inserts a unique word, as an identification signal identifying a boundary between the multiplexed code for the current frame and the one for the next frame, into the boundary, and the variable length code demultiplexer determines a total code length 112 for each frame by detecting this unique word. The present embodiment offers the same advantages as provided by embodiments 1 and 2.

Many widely different embodiments of the present invention may be constructed without departing from the spirit and scope of the present invention. It should be understood that the present invention is not limited to the specific embodiments described in the specification, except as defined in the appended claims.

What is claimed is:

1. A variable length code multiplexer that multiplexes a plurality of input codes including a variable length code into a multiplexed code and outputs the multiplexed code, said multiplexer comprising:
    a forward direction multiplexing means for multiplexing a first subset of codes from the plurality of input codes one by one so that the first subset of codes are running in a forward direction from a head of the multiplexed code to a tail of the multiplexed code;
    a backward direction multiplexing means for multiplexing a second subset of input codes from the plurality of input codes one by one so that they are running in a backward direction from the tail of the multiplexed code to the head of the multiplexed code; and
    a selection means for selecting to assign each of the plurality of input codes to either the first or second subset of codes,
    wherein the plurality of input codes includes variable length encoded band-by-band codes resulting from sound encoding,
    the selection means selects to assign each of the plurality of input codes to either the first or second subset of codes based on the input code's sequential placement within the plurality of input codes and the number of the input codes already multiplexed.

2. The variable length code multiplexer according to claim 1, wherein the tail of the multiplexed code is fixed.

3. The variable length code multiplexer according to claim 1, further comprising a code length calculation means for determining a total code length of the plurality of input codes, wherein said backward direction multiplexing means determines the tail of the multiplexed code based on the total code length determined by said code length calculation means.

4. The variable length code multiplexer according to claim 1, wherein said selection means alternately selects either said forward direction multiplexing means or said backward direction multiplexing means for each of the plurality of input codes.

5. The variable length code multiplexer according to claim 1, wherein said forward direction multiplexing means outputs a length of input codes which have already been multiplexed into the multiplexed code as an already-multiplexed code length, and said selection means selects either said forward direction multiplexing means or said backward direction multiplexing means based on the already-multiplexed code length from said forward direction multiplexing means.

6. The variable length code multiplexer according to claim 5, wherein when the already-multiplexed code length from said forward direction multiplexing means is less than a predetermined value, said selection means selects said forward direction multiplexing means.

7. A variable length code demultiplexer that demultiplexes a multiplexed code into a plurality of output codes including a variable length code and outputs the plurality of output codes, said demultiplexer comprising:
    a forward direction demultiplexing means for demultiplexing the multiplexed code into a first subset of the plurality of output codes one by one so that they are separated from respective areas of the multiplexed code running in a forward direction from a head of the multiplexed code to a tail of the multiplexed code;
    a backward direction demultiplexing means for demultiplexing the multiplexed code into a second subset of the plurality of output codes one by one so that they are separated from respective areas of the multiplexed code running in a backward direction from the tail of the multiplexed code to the head of the multiplexed code; and
    a selection means for selecting said forward direction demultiplexing means to demultiplex a first portion of the multiplexed code extending from the head into the first subset, and selecting said backward direction demultiplexing means to demultiplex a second portion of the multiplexed code extending from the tail into the second subset,
    wherein the plurality of output codes includes variable length encoded band-by-band codes resulting from sound encoding,
    the selection means selects either said forward or backward demultiplexing means for demultiplexing the next output code based on the number of output codes having already been demultiplexed from the multiplexed code.

8. The variable length code demultiplexer according to claim 7, wherein the tail of the multiplexed code is fixed.

9. The variable length code demultiplexer according to claim 7, further comprising a code length decoding means for determining a total code length of the multiplexed code, wherein said backward direction demultiplexing means determines the tail of the multiplexed code based on the total code length determined by said code length decoding means.

10. The variable length code demultiplexer according to claim 7, further comprising a means for determining a total code length of the multiplexed code based on an identification signal identifying boundaries of the multiplexed code for each frame, wherein said backward direction demultiplexing means determines the tail of the multiplexed code based on the total code length of the multiplexed code.

11. The variable length code demultiplexer according to claim 7, wherein said selection means alternately selects either said forward direction demultiplexing means or said backward direction demultiplexing means for each of the plurality of output codes.

12. The variable length code demultiplexer according to claim 7, wherein said forward direction demultiplexing means outputs a length of codes which have already been separated from the multiplexed code as an already-demultiplexed code length, and said selection means selects either said forward direction demultiplexing means or said backward direction demultiplexing means based on the already-demultiplexed code length from said forward direction demultiplexing means.

13. The variable length code demultiplexer according to claim 12, wherein when the already-demultiplexed code length from said forward direction demultiplexing means is less than a predetermined value, said selection means selects said forward direction demultiplexing means.

14. The variable length multiplexer of claim 1, wherein
when a particular code from the first subset of codes is input to the forward direction multiplexing means, the forward direction multiplexing means multiplexes the particular code into the next available code location closest to the head of the multiplexed code; and
when a particular code from the second subset of codes is input to the backward direction multiplexing means, the backward direction multiplexing means multiplexes the particular code into the next available code location closest to the tail of the multiplexed code.

15. The variable length multiplexer of claim 1, wherein the selecting unit assigns a first consecutive set of the plurality of input codes, which correspond to a protected area of the multiplexed code, to the first subset of codes.

16. The variable length multiplexer of claim 15, wherein the protected area corresponds to an area of the multiplexed code for which error correction coding is to be performed.

17. The variable length multiplexer of claim 1, wherein the selecting means selectively switches between the forward and backwards multiplexing means in such a manner that reduces the number of input codes affected by the occurrence of a bit error that occurs after the multiplexed code is output.

18. A system comprising the variable length multiplexer of claim 1, wherein the system further comprises a demultiplexer for demultiplexing the multiplexed code into a series of output codes, the demultiplexer including:
  a forward direction demultiplexing means adapted to demultiplex a segment at the head of the multiplexed code as a next output code;
  a backward direction demultiplexing means adapted to demultiplex a segment at the tail of the multiplexed code as a next output code; and
  a demultiplexer selecting means adapted to determine which of the forward and backward demultiplexing means demultiplexes the next output code in the series of output codes.

19. A variable length code multiplexer that multiplexes a plurality of input codes including a variable length code into a multiplexed code and outputs the multiplexed code, said multiplexer comprising:
  forward direction multiplexing unit for multiplexing a code to the next available location closest to the head of the multiplexed code;
  a backward direction multiplexing unit for multiplexing a code to the next available location closest to the tail of the multiplexed code; and
  a selector adapted to selectively input at least one of the input codes to the forward direction multiplexing unit and at least one of the input codes to the backward direction multiplexing unit,
  wherein the plurality of input codes includes variable length encoded band-by-band codes resulting from sound encoding,
  the selector selects to input each of the plurality of input codes to either the forward or backward direction multiplexing unit based on the input code's sequential placement within the plurality of input codes and the number of the input codes already multiplexed.

20. The variable length code multiplexer of claim 19, wherein the selector is adapted to selectively input the input codes in such a manner as to reduce the number of input codes affected by the occurrence of a bit error that occurs after the multiplexed code is output.

* * * * *